(12) United States Patent
Lehmann et al.

(10) Patent No.: US 11,529,606 B2
(45) Date of Patent: Dec. 20, 2022

(54) DEVICE COMPRISING A REACTOR FACILITY AND METHOD FOR THE ELECTROLYTIC TREATMENT, WITH RELATION TO FLOW DYNAMICS, OF FLUID OR GASEOUS MEDIA OR MIXTURES OF THE TWO IN THE REACTOR FACILITY, AND USE OF THE DEVICE AND THE METHOD

(71) Applicant: EMCO WATER PATENT GMBH, Lingen (DE)

(72) Inventors: Jörg Lehmann, Lingen (DE); Olaf Linden, Gladbach (DE)

(73) Assignee: HYDRO INTELLIGENCE WATER GMBH, Halblech (DE)

( * ) Notice: Subject to any disclaimer, the term of this patent is extended or adjusted under 35 U.S.C. 154(b) by 371 days.

(21) Appl. No.: 16/326,930

(22) PCT Filed: Aug. 18, 2017

(86) PCT No.: PCT/EP2017/070929
§ 371 (c)(1),
(2) Date: Feb. 21, 2019

(87) PCT Pub. No.: WO2018/036923
PCT Pub. Date: Mar. 1, 2018

(65) Prior Publication Data
US 2019/0209999 A1    Jul. 11, 2019

(30) Foreign Application Priority Data
Aug. 24, 2016    (DE) .................. 10 2016 215 906.2

(51) Int. Cl.
*B01J 19/26*    (2006.01)
*B01J 19/08*    (2006.01)
(Continued)

(52) U.S. Cl.
CPC ............ *B01J 19/26* (2013.01); *B01J 19/087* (2013.01); *B01J 19/088* (2013.01);
(Continued)

(58) Field of Classification Search
CPC .. B01J 19/2405; B01J 19/26; B01J 2219/083; B01J 2219/194; B01J 2219/1941;
(Continued)

(56) References Cited

U.S. PATENT DOCUMENTS 3,541,003 A * 11/1970 Carr .................. B01J 19/2405
                                                      208/230
2011/0303532 A1* 12/2011 Foret ................... B01J 19/088
                                                      204/269
2015/0136591 A1    5/2015 Fraim

FOREIGN PATENT DOCUMENTS

DE         38 14 723 A1    11/1988
DE         101 14 936 A1   10/2002
KR         200372276 Y1 *   1/2005

* cited by examiner

*Primary Examiner* — Salil Jain
(74) *Attorney, Agent, or Firm* — John Alumit

(57) ABSTRACT

The invention relates to a device consisting of a reactor facility for the electrolytic treatment, with relation to flow dynamics, of fluid or gaseous media or mixtures of the two. In the context of this invention, electrolytic treatment with relation to flow dynamics means the combination of the production of at least one rotating fluid eddy and the eversion of the eddy by means of electrolysis taking place in the reactor facility. The guided fluid eddy is efficiently treated, cleaned and disinfected by this combination in the reactor facility according to the invention. The invention further relates to a method for the electrolytic treatment, with relation to flow dynamics, of fluid media in the reactor facility according to the invention.

11 Claims, 8 Drawing Sheets

(51) Int. Cl.
*C02F 1/34* (2006.01)
*C02F 1/461* (2006.01)
*C02F 1/467* (2006.01)
*B01J 19/24* (2006.01)
*C02F 103/44* (2006.01)
*C02F 103/42* (2006.01)
*C02F 101/30* (2006.01)

(52) U.S. Cl.
CPC ............. B01J 19/2405 (2013.01); C02F 1/34 (2013.01); C02F 1/4672 (2013.01); C02F 1/46104 (2013.01); B01J 2219/00164 (2013.01); B01J 2219/083 (2013.01); B01J 2219/0809 (2013.01); B01J 2219/0877 (2013.01); B01J 2219/1941 (2013.01); B01J 2219/1946 (2013.01); C02F 2001/46171 (2013.01); C02F 2101/301 (2013.01); C02F 2103/42 (2013.01); C02F 2103/44 (2013.01); C02F 2201/003 (2013.01); C02F 2201/008 (2013.01); C02F 2209/04 (2013.01); C02F 2301/024 (2013.01); C02F 2301/026 (2013.01); C02F 2301/06 (2013.01); C02F 2303/04 (2013.01)

(58) Field of Classification Search
CPC ........... B01J 2219/1943–1946; C02F 1/46104; C02F 1/4672; C02F 1/4674; C02F 1/4676; C02F 1/4678; C02F 2201/003; C02F 2301/021; C02F 2301/026
See application file for complete search history.

DEVICE COMPRISING A REACTOR FACILITY AND METHOD FOR THE ELECTROLYTIC TREATMENT, WITH RELATION TO FLOW DYNAMICS, OF FLUID OR GASEOUS MEDIA OR MIXTURES OF THE TWO IN THE REACTOR FACILITY, AND USE OF THE DEVICE AND THE METHOD

The subject of the present invention is a device in the form of a flow dynamic reactor facility for receiving a fluid medium. The subject of the present method is the flow dynamically/electrolytic treatment of at least one guided fluid eddy in a reaction chamber.

In it, the fluid eddy is produced by putting a fluid medium into rotation in a reaction chamber and receiving it in an outlet pipe by a directional change by means of diversion; the outlet pipe can produce a Venturi effect. The guided volume flow of the fluid medium, at the latest when it exits the reactor facility, forms a fluid eddy.

Furthermore, parts of the housing and of the outlet pipe are insulated electrically from one another both electrically conductively and in fluid-type fashion and can be subject to applied electrical voltage, so that electrolysis can take place in the reactor facility.

Conventional devices and reaction containers as well as methods for flow dynamics treatment of fluid media are known for instance from AT 272 278, DE 195 25 920 A1, DE 101 14 936, or EP 1 294 474 B2.

In AT 272 278 and DE 101 14 936 A1, fluid media are delivered to a reaction chamber and set into rotation by means of its geometric form; in the process, the speed of the rotating fluid medium initially decreases because of the geometric shape of the reaction chamber, and as a consequence it increases again toward the floor region at the lower end of the reaction chamber. The fluid medium moving in rotational fashion to the floor region of the reaction chamber is conducted at the lower end of the reaction chamber, counter to the former flow direction, to a longitudinal axis, is steered upward and is caught in an outlet pipe and leaves the reaction chamber while rotating, forming a hollow eddy. In the floor region of the reaction chamber there are openings along the longitudinal axis or in the immediate vicinity thereof, so that via the hollow eddy sink, which at its core generates a negative pressure, additional fluid media can be aspirated.

In DE 195 25 920 A1, an expansion of the device of AT 272 278 is described. In it, the fluid medium to be cleaned flows alternatingly in ascending and falling fashion through inlet tubes communicating with one another, and after that, downstream of the outlet from the reaction chamber, the flowing fluid medium is conducted into a tube labyrinth for sedimentation or for collecting the thickened waste products.

A disadvantage of these devices is the complicated embodiment, the unwieldiness for an intended technical use, the lack of flexibility and adjustability of the components or parts of the reactor facility, and the resultant poor replicability of the results.

In EP 1 294 474 B2, the reaction chamber of the reactor facility is constructed with a heart-shaped or pear-shaped cross section. The outlet pipe, which is adjustable and extends into the floor region, along the longitudinal axis of the reaction chamber is embodied in the region near the mouth as a nozzle for attaining the Venturi effect.

The fluid medium is added to the upper part of the reaction chamber via at least one delivery opening located tangentially to the cross section of an inner surface of the reaction chamber and moves, accelerated and in rotation, as a fluid eddy in the downward flow direction around the outlet pipe. As a result of a fluid guide, which in the lower housing region diverts the volume of fluid that flows through the reactor, which maintains its absolute rotary direction, rotationally toward the longitudinal axis, a region of rotating volume of fluid that flows through the reactor that rub against one another is created, each at high speeds. The result of the relative speed attained and the pronounced friction is mechanical comminution and destruction of entrained or dissolved substances.

The delivery opening here is larger than the smallest cross section of the nozzle in the region of the outlet pipe near the mouth; as a result, a dynamic pressure is created. Thus, along with the fluid eddy formation, which generates a vacuum in the core of the eddy, an additional vacuum effect in the translational direction is due to of a Venturi effect. The Venturi effect is in turn based on the Bernoulli equation $$p_{ges.} = p_0 + \frac{p}{2}c^2 + pgh;$$

in this equation, $p_0$ is the static pressure, which is present on all sides in the flow;

$$\frac{p}{2}c^2$$

is the dynamic pressure, which is equivalent to the kinetic component of the energy with the flow speed c, and pgh represents the geodetic pressure component. The flow speed c in turn results from the product of the angular speed $\omega$ having the radius r, which extends in longitudinal section from the outermost point of the reaction chamber toward the outer wall of the outlet pipe ($c=\omega \cdot r$). The angular speed $\omega$ below is also equivalent to the rotary speed of the fluid medium.

Furthermore, because of the high centrifugal force and because of the friction, the structure of the fluid medium varies such that in the case of liquid fluid media, a change in the surface tension and a viscosity ensues. In this state, the fluid medium enters, rotating, into the inlet opening of the outlet pipe. As a result, an eddy flow develops, with an eddy core at high speed, which because of the laws of flow dynamics generates a vacuum in its middle. The nozzle for attaining the Venturi effect, which is present in the lower region near the mouth of the outlet pipe, causes this vacuum region, given equivalent flow speed, to be superimposed and thus intensified by the generation of an additional vacuum. The resultant negative pressure can according to Bernoulli's equation amount to absolutely <10 mbar. By means of pressure and negative pressure as well as the associated eddy formation, very high mechanical forces in the fluid medium are liberated. They cause a change in the structure of the fluid medium, to the extent of a slight surface tension.

Organic components entrained in the fluid medium, such as bacteria and germs, burst open mechanically because of their own internal cellular pressure (turgor) in the negative-pressure range of a nozzle. The organic residues are carried through the altered pressure region to a chemical reaction, based on the thermal state equation of ideal gases, $p \cdot V = m \cdot R \cdot T$. Entrained strains can be carried to reaction, depending on the necessary reaction enthalpy, in the negative-pressure range. The result is oxidation of the fluid medium with oxidation means such as oxygen or by means of aspirated oxygen from the ambient air. This happens as a function of the energy input in the system with other oxidizable substances as well—however, there, a limit is set physically in accordance with the thermal state equation of ideal gases.

Associated with this is poor economic usefulness for generating the negative pressure and what, despite a surprisingly good mode of operation is limited enthalpy production for reaction of chemical compounds or organic stresses without their own internal cell pressure (turgor), such as in yeasts and fungi. For instance, the energy is insufficient for the decomposition and/or oxidation of highly condensed aromatic hydrocarbons or the breakdown of heavy oil.

A disadvantage of these inventions is the high amount of energy required to put the fluid medium into rotation, which has to do with the form and embodiment of the reaction chamber.

In the treatment of aqueous media, the COD and BOD values are important indicators. The chemical oxygen demand (COD), as a summation parameter, is a measure for the sum of all the organic chemical compounds and oxidizable substances that are present in water and can be broken down under certain conditions. It indicates the quantity of oxygen (in mg/l) that would be needed for their oxidation if oxygen were the oxidant. The COD value serves as an assessment for pollutants that have been discharged into waste water or that must be disposed of within a period of time. The biochemical oxygen demand (BOD) indicates the quantity of oxygen that is needed for biotic breakdown of organic (harmful) substances/bacteria present in the water under certain conditions and within a certain period of time. In particular, the biological oxygen demand serves as a contaminant parameter for assessing the pollution of waste water.

The object of the present invention is to propose an advantageous device, and an advantageous method for operating this device, which overcome the disadvantages of the relatively slightly produced energy input of the prior art, in order to split further ingredients, dissolved in the fluid medium, that require a higher energy input and have no internal cellular pressure of their own. These include for instance highly condensed aromatic hydrocarbons or heavy oil.

The object of the invention is ensure that foreign substances in the fluid medium that are difficult to destroy or have already been dented are broken apart, in order to ensure an advantageous and complete cleaning and processing of the fluid medium.

The combination of the flow-dynamic treatment of the fluid medium, which is set into rotation in the rotationally symmetrical reaction chamber, as a result of which the first foreign substances encountered have already been dented, with an electrolytic treatment are intended to lead to easier splitting, destruction and breakdown of foreign substances dissolved in the fluid medium.

Because of the varying pressure conditions in the reaction chamber on the basis of eddy formations, the associated breakdown and mechanical destruction of organic ingredients, such as microorganisms and organic materials (bacteria, fungi, germs, algae) and the comminution of foreign substances dissolved in the fluid medium, such as long-chain molecular compounds, and the breakdown of inorganic ingredients such as heavy oils by chemical reactions, as well as the varying grid structures of a fluid medium and the attendant change in the tension in the case of incompressible media because of the existing frictional and centrifugal forces, is intended to be associated with the advantages of electrolysis in fluid media or plasma development in gaseous media and thus to be more efficient.

Fluid media are to be cleaned and processed quickly, inexpensively, in a space-saving and environmentally friendly way, and powerfully/efficiently. The COD and BOD values are to be increased in comparison to the prior art and to other methods and processing techniques.

Furthermore, the intended object of the invention is to use the device and the method of the invention as well as a device for performing the method.

This object is attained with the features recited in claims 1 and 10. Advantageous features of the device of the invention, the method of the invention, and the use of the invention, are recited in claims 2 through 9 and 11 through 15.

According to the invention, the object is attained by a reactor facility for flow dynamically/electrolytic treatment of fluid media based on mechanical, physical, chemical and electrolytic processes.

The object is attained by a flow dynamic reactor facility for receiving a fluid medium for producing and flow-dynamically/electrolytically treating least one guided fluid eddy, including a housing and an outlet pipe; by means of the inner walls in contact with the fluid, the housing forms a fluid-carrying hollow chamber, hereinafter called a reaction chamber that is rotationally symmetrical about a longitudinal axis, and the reaction chamber is split in the flow direction of the fluid medium into an upper and a lower part. The upper part of the reaction chamber has at least one delivery opening located at a tangent to the inner surface of the upper part of the reaction chamber; through this opening, the fluid medium is introduced into the reaction chamber. The lower part of the reaction chamber extends in the flow direction as far as the lower boundary of a curved floor region, in which there is a geometrically ascending-shaped fluid guide, which diverts the fluid medium into an inlet opening of the outlet pipe. Furthermore, the outlet pipe coincides in its longitudinal axis with the longitudinal axis of the rotationally symmetrical reaction chamber. The inlet opening of the outlet pipe is located at a spacing a to what in the flow direction is the lower boundary of the curved floor region. According to the invention, parts of the fluid-carrying components of the reactor facility are embodied as a first electrode and a second electrode. The first and second electrodes are electrically insulated from one another in fluid-tight fashion.

A fluid medium is delivered into the reaction chamber. Fluid media and fluids in the sense of the invention are liquid and/or gaseous substances and/or mixtures of liquid and/or gaseous substances.

Preferably, the fluid medium is a liquid. In one embodiment, at least one pure liquid is delivered as a fluid medium to the reactor facility. In a further embodiment, more than one liquid is delivered as a fluid medium to the reactor facility. Especially preferably, the fluid medium is an aqueous liquid or aqueous solution, or in other words contains water.

In one embodiment, a mixture of at least one liquid and at least one gas is delivered to the reactor facility. In a further embodiment, more than one mixture of at least one liquid and at least one gas is delivered to the reactor facility.

In an alternative embodiment of the invention, at least and exclusively one gaseous substance or one gaseous mixture is treated, as a fluid medium, in the reactor facility. In a particular embodiment, at least one gas is delivered to the reactor facility.

In the reaction chamber, the at least one delivered guided fluid medium or the at least one guided fluid eddy formed is treated flow-dynamically/electrolytically.

The term "flow dynamics treatment of the fluid medium" in the flow dynamic reactor facility of the invention is understood as follows: The fluid medium is guided as a volume flow via at least one delivery opening and one fluid inlet region, adjoining it in the flow direction, into the reactor facility. The flow direction always refers to that of the fluid medium.

As a result of the geometry and design of the reaction chamber, at least one guided fluid eddy is formed. This is done with an eddy diversion of the at least one fluid eddy and the burst open of organic components, dissolved in the fluid medium, with internal cellular pressure (turgor). The at least one guided fluid eddy generated is thus treated using flow dynamics in the reactor facility, and in the process is processed, cleaned and disinfected.

The term "electrolytic treatment" of the at least one guided fluid eddy is understood according to the invention to mean electrolysis with a first and a second electrode and with the fluid medium as electrolytes, and it significantly improves the performance and efficiency of the flow-dynamic treatment.

The term "flow-dynamically/electrolytic treatment" is thus understood in the context of this invention as the combination of a volume flow brought to rotation and electrolysis (taking place beforehand or simultaneously or afterward) in a reactor facility, specifically for processing, cleaning and disinfecting fluid media.

The flow-dynamics treatment of the at least one guided fluid eddy is achieved by the reactor facility of the invention and the method of the invention for operating this reactor facility. By the combination of flow-dynamic and electrolytic treatment of the at least one fluid eddy produced, the conversion and/or mechanical and physical destruction and/or radicalization of chemical substances or microorganisms found in the fluid medium preferably occurs. Preferably, parts of the fluid-carrying components of the reactor facility are embodied as a first and a second electrode. The first and second electrodes are electrically insulated in fluid-tight fashion from one another, and an electrical voltage is applied to the first and the second electrode, independently of one another, and thus electrolysis is performed in the fluid medium.

By the geometry and design of the reactor facility of the invention and the use of at least components or parts of the reactor facility as respective first and second electrodes, an additional energy input for decomposition of foreign substances dissolved in fluid media is introduced.

The reactor facility includes a plurality of components or parts, such as a housing and an outlet pipe, which will be referred to in more detail hereinafter. According to the invention, parts of the fluid-carrying components of the reactor facility are embodied as a first and a second electrode, and the first and second electrodes are electrically insulated in fluid-tight fashion from one another.

The term "fluid-tight" will be understood to mean that the electrical insulation does not come into contact with the fluid medium. Any electrically nonconductive material with low and thus insignificant electrical conductivity can be used as electrical insulation (insulating material) for hindering the flow of electric current.

The housing consists of a stable material and a body that is hollow in the interior. The housing, by means of the inner walls in contact with fluid, forms a hollow chamber that is rotationally symmetrical about a pivot axis and that will hereinafter be called the reaction chamber. The reaction chamber is thus rotationally symmetrical to the pivot axis. The pivot axis of the reaction chamber will hereinafter be called the longitudinal axis.

All the details recited below regarding the components and parts of the reactor facility refer always to one-half of the reactor facility in longitudinal section. The construction of the second half of the reactor facility on the other side of the longitudinal axis is, however, the same, since the reactor facility is embodied mirror-symmetrically in longitudinal section.

The outer walls of the housing can assume an arbitrary geometrical form. Preferably, the housing is embodied rotationally symmetrically.

In longitudinal section of the reactor facility, an imaginary center plane is located horizontally (that is, perpendicularly to the longitudinal axis). In one embodiment, the center plane extends through the upper part of the housing and of the reaction chamber. In a further embodiment, the center plane extends through the upper part of the housing and the reaction chamber. In a further embodiment, the center plane extends through the center points of the fluid inlet region that in the flow direction adjoins the at least one delivery opening.

The housing, in the installed state, is split relative to this center plane into an upper part and a lower part. The upper part of the housing in the installed state is located above the center plane, and the lower part of the housing is attached below the center plane in the flow direction of the fluid medium.

The term "flow direction of the fluid medium" is understood to be the flow direction of the fluid medium guided into the reactor facility. In the installed state, at the lower boundary of the floor region of what in the installed state is the lower part of the reaction chamber, the fluid medium flows downward and at the fluid guide is diverted upward (contrary to its original direction) into the inlet opening of the outlet pipe. In one embodiment, the fluid medium leaves the reactor facility through the outlet opening of the outlet pipe, at a higher point in the installed state than where it entered the reactor facility through the at least one delivery opening.

In one embodiment, the housing includes at least two openings. The at least two openings include one opening for an inlet pipe for the medium inflow and one opening, located in the upper part of the housing centrally along the longitudinal axis, for an outlet pipe for the medium outflow. In a further, especially preferred embodiment, the housing furthermore also more than one opening for a plurality of inlet pipes and media inflows, for instance, two, three, four or more openings.

In a further preferred embodiment, the housing includes a further opening, and this opening represents an opening, located centrally along the longitudinal axis, in the installed state in the lowermost part of the housing for introducing a fluid guide.

Advantageously, the housing has at least one opening for the outlet pipe, at least one opening for introducing a fluid guide, and at least one opening for an inlet pipe.

As a result, more than one fluid medium can be conducted into the upper part of the reaction chamber, and less force is used for introducing the volume flows into the reaction chamber. The volume flows can derive from the pipelines of a main inlet or multiple inlet lines. The volume flows can furthermore consist of the same fluid medium, or different fluid media.

In one embodiment, the housing is at least partially electrically conductive. Advantageously, the fluid-carrying components of the housing are electrically conductive. In a further embodiment, the entire housing is electrically conductive.

The reaction chamber can assume various geometries. In a very particularly preferred embodiment, the reaction chamber is formed rotationally symmetrically.

The reaction chamber that is rotationally symmetrical about a longitudinal axis is shaped by the inner walls of the housing. In one embodiment, the inner walls of the housing are in contact with the fluid medium. The inner walls of the housing that are in contact with the fluid medium will hereinafter be called walls of the fluid-carrying reaction chamber. The reaction chamber is split, in the flow direction of the fluid medium, into an upper part and a lower part.

The reaction chamber receives the fluid medium that is flowing in through the at least one delivery opening. The fluid medium is conducted as a flow, hereinafter also called volume flow, through the at least one delivery opening into a fluid inlet region in the upper part of the rotationally symmetrical, fluid-carrying reaction chamber and in its further course forms a fluid eddy.

The choice of flow speed depends on the particular properties of the fluid medium and can be ascertained from the strength of the covalent bond and/or the consistency of the molecules. Advantageously, a high speed is chosen for introducing the fluid medium into the upper part of the reaction chamber.

Since the reaction chamber is formed by the inner walls, in contact with the fluid, of the housing, it, analogously to the housing, also has the openings of the housing. The reaction chamber therefore includes at least two openings (one opening for the inlet pipe, which in section with the inner surface of the upper part of the reaction chamber forms a tangentially located delivery opening for the medium inflow, and one opening in the upper part of the reaction chamber along the opening located centrally for the outlet pipe to the media exit). In a further especially preferred embodiment, the reaction chamber furthermore has more than one delivery opening, for instance two, three, four or more delivery openings.

The reaction chamber and the openings for the media flow and for the media exit are designed and located relative to one another in such a way that in the fluid medium to be treated, upon flowing through the reaction chamber from the at least one delivery opening to the outlet opening, the greatest possible shear stresses are produced by friction of the individual flow layers with one another and with the walls of the reaction chamber.

In a preferred embodiment, the reaction chamber has a further opening, and this opening represents an opening, located centrally to the longitudinal axis, on the lower boundary of the floor region of the reaction chamber for introducing a fluid guide.

Very preferably, the reaction chamber has at least one opening for the outlet pipe, at least one opening for introducing a fluid guide, and at least one delivery opening.

Preferably, the reaction chamber has two delivery openings. As a result, preferably two or more than two volume flows are introduced into the reaction chamber. The speed of the volume flows here should be selected such that from a flow technology standpoint a turbulent boundary layer can develop and that the volume flows have a high speed difference. Preferably, a combination of translational motion and simultaneous rotary motion is chosen such that the volume flows touch one another.

In one embodiment, all the walls of the reaction chamber are in contact with the fluid medium introduced through the at least one delivery opening. In an alternative embodiment, only a portion of the walls of the reaction chamber are in contact with the fluid medium introduced through the at least delivery opening.

In one embodiment, the walls of the reaction chamber that are in contact with fluid are at least partially electrically conductive. In one embodiment, all the walls of the reaction chamber that are in contact with fluid are at least partially electrically conductive. In an alternative embodiment all the walls of the reaction chamber are electrically conductive.

The reaction chamber in the installed state is split along the longitudinal axis in the flow direction into an upper part and a lower part, which are each rotationally symmetrical.

According to the invention, the upper part of the reaction chamber is understood to be that part in which the fluid medium is introduced through the at least one delivery opening. The upper part of the reaction chamber, viewed along a center plane, extends from the at least one delivery opening for the medium inflow to an outer wall of the outlet pipe.

In one embodiment, the upper part of the reaction chamber has a top face and a bottom face, which are each formed by the walls of the reaction chamber.

Preferably, the upper part of the reaction chamber has at least one delivery opening which enters at a tangent to the cross section of the inner surface of the upper part of the reaction chamber and by which the fluid medium is carried into the reaction chamber.

The at least one delivery opening is adjoined in the flow direction of the fluid medium by a fluid inlet region in the upper part of the reaction chamber, which part preferably has what in section is a circular surface.

The lower part of the reaction chamber is understood to be that part which, in the installed state and in the flow direction of the fluid medium, follows the upper part of the reaction chamber and is formed by the inner walls, in contact with fluid, of the lower part of the housing.

In one embodiment, the reaction chamber has a maximum extent along the center plane; that is, walls facing one another have a maximum cross section in longitudinal section.

In one embodiment, the lower part of the reaction chamber in the flow direction of the fluid medium has a decreasing spacing from the outer wall of the outlet pipe. Preferably, the decreasing spacing is continuous. Advantageously, the fluid medium is as a result accelerated faster, and fewer pressure losses occur in the reaction chamber.

In an alternative embodiment, the lower part of the reaction chamber in the flow direction of the fluid medium has a spacing that decreases abruptly to the outer wall of the outlet pipe.

The lower part of the reaction chamber extends in the flow direction of the fluid medium to a lower boundary of the floor region.

The floor region forms what in the installed state is the lower boundary of the lower reaction chamber.

In one embodiment, the floor region in the flow direction of the fluid medium begins at a curvature of the transition of the bottom face of the lower part of the reaction chamber.

In one embodiment, the wall of the floor region of the lower part of the reaction chamber assumes an arbitrary contour. Preferably, the floor region is curved. Especially preferably, the floor region is curved in concave fashion. The term "concave curvature" is understood here to mean a bulge projecting in longitudinal section outward, that is, downward in the installed state. In an alternative embodiment, the floor region is designed as a paraboloid. In a further alternative embodiment, the floor region has a different contour, such as an angular contour.

As a result of the preferred curved floor region, the course of the walls of the lower part of the reaction chamber is reversed, and the fluid medium is diverted in its flow direction. Advantageously, the majority of the components to be treated in the fluid medium, such as organic components, are made to burst open because of the diversion of the fluid eddy.

The curved floor region in the installed state includes a lower boundary, which extends along the lower region of the lower part of the reaction chamber.

In one embodiment, in the lower boundary of the floor region of the lower part of the reaction chamber, a geometrically ascending fluid guide is inserted, the longitudinal axis of which coincides with the longitudinal axis of the rotationally symmetrical reaction chamber. In the case of an inserted fluid guide, the contour of the lower part of the reaction chamber extends from the lower boundary of the floor region continuously to the fluid guide, or a protrusion of the fluid guide.

The function of the reactor facility of the invention is based on the initiation of physical, mechanical and chemical reactions by creating suitable pressure conditions in the reaction chamber.

The strong point and thus the effectiveness of the reactor facility of the invention are pressure-, speed-, and temperature-dependent. The rotationally symmetrical design of the reaction chamber effects such a strong acceleration of the volume flow in the developing fluid eddy that the biological, physical and chemical processes taking place in the fluid medium are accelerated. The volume flow is established variably among other ways as a function of the size of the reaction chamber or on the reaction chamber volume.

In one embodiment, the reaction chamber formed by the inner walls, in contact with fluid, of the housing assumes an arbitrary shape. However, it must always be ensured that by means of the shape of the reaction chamber, a fluid medium can be set into rotation. In a preferred embodiment, the reaction chamber in longitudinal section has what in the installed state is a transition from a wide region to a narrow region. Preferably, the reaction chamber is shaped rotationally symmetrically.

The reaction chamber, in one embodiment, is designed in longitudinal section of the reactor facility as heart-shaped or pear-shaped, with a decreasing cross section from the media inflow to the media outlet. The principle construction has already been described in EP 1 294 474 B2. Extensive experiments with various forms of the reaction chamber and adjustments of the process parameters show that when using a heart shape in conjunction with the adjustment of media-specific variable parameters, such as volume flow, flow pressure, dynamic pressure and negative pressure of the fluid medium to be treatment, the type and amount of fluid medium additionally introduced, contour of the nozzle, position of the fluid guide, position of the media outlet relative to one another, and the temperature of the fluid medium, optimal successes are achieved.

The reaction chamber radius, which extends in longitudinal section from the wall and boundary of the reaction chamber to the outer wall of the outlet pipe, initially increases digressively in the flow direction along the outer wall of the outlet pipe, until the tangent to the course of the contour of the longitudinal section of the reaction chamber extends parallel to this longitudinal axis. This point is reached at approximately ¼ to ⅓ of the total length of the imaginary longitudinal axis of the reaction chamber. The reaction chamber radius reaches its maximum value here. From there outward, from the wall of the reaction chamber to the outer wall of the outlet pipe, the reaction chamber radius decreases with a longitudinal coordinate that increases in the flow direction, initially progressively as far as a longitudinal coordinate which equivalent to approximately ⅔ to ¾ of the total length of the longitudinal axis. After that, the reaction chamber radius decreases digressively; that is, the contour course of the longitudinal section of the reaction chamber asymptotically approaches a line parallel to the longitudinal axis.

In a further advantageous alternative embodiment, the upper part of the reaction chamber is shaped in platelike fashion in longitudinal section. As a result of this shape it is possible for losses of flow energy in the reaction chamber during the flow-dynamically/electrolytic treatment to be reduced by means of the optimized geometric and rotationally symmetrical design of the reaction chamber as far as the inlet opening of the outlet pipe. Furthermore, because of this alternative design of the device, while the energy consumption is the same, a greater acceleration of the fluid medium in the reaction chamber is attainable. Furthermore, the development of unwanted eddies, resulting from friction of the fluid media, in the reaction chamber is to be reduced.

The upper part of the reaction chamber has a top face and a bottom face as well as a transition region from the top face to the bottom face. In the transition region from the top face to the bottom face, the upper part of the reaction chamber has the maximum radius $r_{max}$ relative to the outer wall of the outlet pipe, and this is also where the at least one delivery opening, located at a tangent to the inner surface of the upper part of the reaction chamber, with a fluid inlet region adjoining it in the flow direction, is located. The top and bottom faces have a setting angle to the longitudinal axis of 80° to 115°, preferably from 90° to 110°, and very particularly preferably of 90°; the setting angle $\alpha$ adjusts to the angle which, viewed in longitudinal section in the installed state, is established relative to the longitudinal axis of the reaction chamber.

The setting angle at $\alpha=90°$ is established from the center plane to the longitudinal axis, and the center plane extends through the center points of the fluid inlet region. This is also true for a spacing b that remains the same between the top and bottom faces (the center plane then extends parallel to both), as well as for a decreasing spacing b between the top and bottom faces. The setting angle at $\alpha=90°$ always refers to the angle, established in the installed state, below the center plane, that is, from the center plane to the longitudinal axis of the reaction chamber. For that purpose, the section of the longitudinal axis with the center plane represents a Cartesian coordinate system. Thus the setting angle $\alpha=90°$ always refers to the third and/or fourth quadrants of the Cartesian coordinate system. The setting angles $\alpha>90°$ or $\alpha<90°$ are established from the imaginary intermediate plane to the longitudinal axis, and the imaginary intermediate plane runs through the center points of the fluid inlet region and parallel to the top face of the upper part of the reaction chamber. This is true for a spacing b that remains the same between the top and bottom faces (the imaginary intermediate plane then extends parallel to both) as well as for a decreasing spacing b between the top and bottom faces. The setting angles $\alpha>90°$ or $\alpha<90°$ always refer to the angle, established in the installed state, below the imaginary intermediate plane, that is, from the imaginary center plane to the longitudinal axis of the reaction chamber.

The lower part of the reaction chamber extends in the flow direction at a spacing z from the transition of the bottom face of the lower part of the reaction chamber to the lower boundary of a curved floor region of the lower part of the reaction chamber, where the geometrically ascendingly shaped fluid guide diverts the fluid medium into an inlet opening of the outlet pipe. The fluid inlet region has a diameter $d_z$. The top face and the bottom face of the upper part of the reaction chamber have a maximally constant or decreasing spacing b from one another in the flow direction as far as the transition from the bottom face to the lower part of the reaction chamber; the spacing b is equivalent to from one to three times the diameter $d_z$ of the fluid inlet region ($b \leq 3\ d_z$). Furthermore, the spacing a between the inlet opening of the outlet pipe and what in the flow direction is the lower boundary of the curved floor region is smaller than the diameter of the fluid inlet region $d_z$ ($a<d_z$). Furthermore, the spacing z amounts to at least half the diameter of the fluid inlet region $d_z$ ($z \geq \frac{1}{2}\ d_z$). Furthermore, a radius $r_1$ defines that spacing which extends from the bottom face of the upper part of the reaction chamber to the outer wall of the outlet pipe along a plane parallel to a center plane. A radius $r_3$ defines that spacing which extends from the beginning of the transition of the bottom face of the lower part of the reaction chamber to an outer wall of the outlet pipe. Here $r_1$ is at least greater than the sum of the diameter of the fluid inlet region $d_z$ and of the spacing $r_3$ ($r_1 \geq d_z + r_3$).

Advantageously, by the alternative embodiment of the upper part of the reaction chamber, losses of flow energy are reduced, or for the same energy consumption, a greater acceleration of the fluid medium in the reaction chamber is achieved. In combination with electrolysis, the efficiency of the reactor facility is thus advantageously increased.

The at least one delivery opening is located in the upper part of the reaction chamber. Thus by means of the at least one delivery opening, the media inflow into the upper part of the reaction chamber takes place.

Preferably, the housing has at least one opening for an inlet pipe, as a result of which the fluid medium in the inlet pipe is carried through the at least one delivery opening, formed and located at a tangent to the cross section of the inner surface, into the upper part of the reaction chamber. Advantageously, because of there being only one delivery opening, less energy is expended for the media inflow into the reaction chamber.

As a result of the location of the at least one delivery opening and of a fluid inlet region adjoining it in the flow direction, the volume flow of the fluid medium introduced has a descending inflow direction into the reaction chamber.

In a preferred embodiment, the fluid medium is introduced into the upper part of the reaction chamber through more than one delivery opening located at a tangent to the inner surface of the upper part of the reaction chamber; for instance, this is two, three, four or more delivery openings. In a further preferred embodiment, the upper part of the reaction chamber has two delivery openings, which are opposite one another relative to the longitudinal section in the upper part of the reaction chamber.

The fluid medium to be treated is introduced from an inlet pipe, located outside the reactor facility, through the opening in the housing and the adjoining at least one delivery opening formed, into the upper part of the rotationally symmetrical reaction chamber. The inlet pipe for the media inflow is equivalent to the main inflow, or to pipelines branching off from it.

The inlet pipe extends through the opening in the housing and intersects the inner surface of the upper part of the reaction chamber at a tangent in cross section, thus forming an obliquely cut-off circular cylinder and the at least one delivery opening. The fluid medium to be treated thus, through the at least one delivery opening, enters the upper part of the reaction chamber at a tangent to the cross section of the inner surface of the upper part of the reaction chamber.

In one embodiment, the inlet pipe represents a pipe inlet line and thus an elongated hollow body, preferably a round tube with a circular surface in cross section. The at least one delivery opening, because of the intersection of the inlet pipe with the inner surface of the upper part of the reaction chamber, has a circular or elliptical surface.

The at least one delivery opening is adjoined in the flow direction in the upper part of the reaction chamber by a fluid inlet region, which receives the fluid medium flowing into the reaction chamber through the at least one delivery opening and carries it onward. In a particularly preferred embodiment, the fluid inlet region is located along the center plane.

In one embodiment, precisely one fluid medium is carried through a delivery opening into the adjoining fluid inlet region of the upper part of the reaction chamber. In an alternative embodiment, more than one fluid medium is carried into the reaction chamber, preferably each through a delivery opening. Alternatively, more than one fluid medium is carried through the same delivery opening into the reaction chamber. The fluid media can be identical or different. The fluid media can originate in the main flow or in pipelines branching off from it, or other inlet pipes.

The outlet pipe is a pipe embodied as a continuous hollow cylinder and is introduced in sealing fashion in an opening located centrally along the longitudinal axis in the upper part of the housing in the longitudinal section of the reactor facility. In one embodiment, at least one part of the outlet pipe is electrically insulated from the housing, and thus from the reaction chamber, in fluid-tight fashion.

In a particular embodiment, the outlet pipe consists of a plurality of cylindrical hollow parts. In terms of the invention, the outlet pipe is subdivided into an upper part and a lower part.

In one embodiment, the outlet pipe is preferably displaceable and adjustable relative to the centrally located opening in the housing, and thus relative to the reaction chamber, along the longitudinal axis, and it thus advantageously adapts to the properties and treatment of the fluid medium. The adjustment of the outlet pipe is effected via a mechanical adjusting unit. The outlet pipe is received in such a way in an axial bearing that is solidly connected to the housing or fixed relative to it that an adjustment along the longitudinal axis is possible even during operation, without changing the position of the intersection between the housing and the pipeline of the main inflow or other incoming lines. As a result, an adaptation of the operating parameters is possible at any time as needed and without major effort or expense.

The outlet pipe coincides in its longitudinal axis with the longitudinal axis of the rotationally symmetrical reaction chamber. The outlet pipe, measured from the longitudinal axis to the outer wall of the outlet pipe, has a radius $r_2$. In one embodiment, the spacing $r_2$ is constant at all points of the outlet pipe. In an alternative embodiment, the spacing $r_2$ at various points of the outlet pipe is not constant. This is due to a varying spacing from the outer wall to the inner wall of the outlet pipe, and this spacing is called the wall thickness d.

In one embodiment, the inner walls of the outlet pipe are in contact with the fluid medium and thus carry fluid.

The upper part, in the installed state, of the outlet pipe is located in the upper part of the reaction chamber, and/or outside the housing. The outlet pipe in the upper part has an upper region near the mouth, which region protrudes from the housing and can be embodied as an inspection pipe. The end of the upper region, near the mouth, is embodied as an outlet opening for the fluid medium and is located outside the housing. This is where the exit of the fluid medium (media exit) from the reactor facility takes place.

The total cross section of the outlet opening is composed of the free cross section and the wall thickness of the outlet pipe: $d_{ges}=2 \cdot r_2=2 \cdot (d+d_{frei})$. The free cross section $d_{frei}$ of the outlet opening, through which the diverted fluid medium leaves the outlet pipe, represents the spacing between the two inner walls, opposite one another and in contact with the fluid, of the outlet pipe at the end of the upper region, near the mouth, and is calculated from the difference between the total cross section of the outlet opening and the wall thicknesses: $d_{frei}=d_{ges}-(2 \cdot d)=(2 \cdot r_2)-(2 \cdot d)$.

What in the installed state is the lower part of the outlet pipe is located for the most part in the lower part of the reaction chamber, or in the floor region of the lower part of the reaction chamber. The outlet pipe in the lower part has a lower region near the mouth, which region in the flow direction of the fluid medium adjoins the inlet opening of the outlet pipe. The region near the mouth of the lower part of the outlet pipe extends along its longitudinal axis to almost the lower boundary of the floor region of the lower part of the reaction chamber. The end of the lower region near the mouth is embodied as an inlet opening, which is located in level fashion and is perpendicular to the longitudinal axis, for the fluid medium diverted at the floor region.

The total cross section of the inlet opening is composed of the free cross section and the wall thickness of the outlet pipe: $d_{ges}=2 \cdot r_2=2 \cdot (d+d_{frei})$. The free cross section $d_{frei}$ of the inlet opening, through which the diverted fluid medium reaches the outlet pipe, represents the spacing between the two inner walls, opposite one another and in contact with fluid, of the outlet pipe at the end of the lower region near the mouth and is calculated from the difference between the total cross section of the inlet opening and the wall thicknesses: $d_{frei}=d_{ges}-(2 \cdot d)=(2 \cdot r_2)-(2 \cdot d)$. Preferably, the inlet opening and the outlet opening have the same value for the free cross section $d_{frei}$. Also preferably, the free cross section $d_{frei}$ decreases only in the vicinity of the nozzle for attaining the Venturi effect.

The inlet opening of the outlet pipe, according to the invention, is located at a spacing a from what in the flow direction is the lower boundary of the curved floor region of the lower part of the reaction chamber. In one embodiment, the inlet opening is located at a variable spacing a from the lower boundary of the curved floor region.

The inlet opening of the outlet pipe is adjoined in the flow direction of the fluid medium by the region, near the mouth, of the outlet pipe. In one embodiment, the outlet pipe is designed in the interior as a hollow pipe, with a constant spacing between the two inner walls, facing one another, that are in contact with the fluid. Preferably, the constant spacing is equivalent to the free cross section $d_{frei}$ Especially preferably, the inlet opening, the outlet opening, and the region between them (that is, between the lower and upper regions near the mouth) has the same value for the free cross section $d_{frei}$.

In a preferred embodiment, the region, near the mouth, of the outlet pipe is embodied as a nozzle for attaining the Venturi effect, hereinafter also simply called nozzle. For attaining the Venturi effect, the inner walls of the outlet pipe which are in contact with the fluid each have a narrowest point; these points form the nozzle. This is as a rule the point having the smallest free cross section of the inner walls, in contact with the fluid, of the outlet pipe. That in turn leads to an increase in the wall thickness d of the outlet pipe.

If the total cross fluid cross section $d_{ges}$ of the inlet opening of the outlet pipe is smaller than the diameter of the fluid inlet region, then based on Bernoulli's equation, the pressure at the inlet opening of the outlet pipe drops. If the lower region, near the mouth, of the outlet pipe is embodied as a nozzle with the smallest free cross section, then the pressure is established such that in the nozzle for attaining the Venturi effect, a negative pressure ensues.

Advantageously, the nozzle for attaining the Venturi effect can be exchanged or replaced in the event of cleaning, damage, or defects. In a preferred embodiment, the nozzle is designed as a Venturi nozzle. In a further preferred embodiment, the nozzle is designed as Laval nozzle.

In one embodiment, parts of the outlet pipe are at least partially electrically conductive. In a further embodiment, the entire outlet pipe is electrically conductive.

The fluid guide consists of a single (massive) body. In an alternative embodiment, the fluid guide consists of a plurality of components. If in what follows "the term fluid guide" is used, this always refers to what in the installed state is an upper part of the entire fluid guide component, which is introduced into the lower part of the reaction chamber.

In one embodiment, the fluid guide is introduced through a centrally located opening in what in the installed state is the lower part of the housing in sealing fashion into the lower boundary of the floor region of the lower part of the reaction chamber. In an alternative embodiment, the fluid guide is a part of the housing and thus is already fixedly integrated with the lowermost part thereof. In one embodiment, the longitudinal axis of the fluid guide coincides with the longitudinal axis of the rotationally symmetrical reaction chamber.

In one embodiment, the fluid guide is electrically conductively connected to the housing. In a further embodiment, the fluid guide is electrically conductive and is electrically insulated in fluid-tight fashion from the remainder of the housing.

In an alternative embodiment, parts of the fluid guide are connected electrically conductively to the housing. In a further alternative embodiment, at least parts of the fluid guide are electrically conductive and are electrically insulated in fluid-tight fashion from the remainder of the housing.

The fluid guide precedes the outlet pipe in the flow direction of the fluid medium. In one embodiment, the fluid guide is shaped geometrically and mirror-symmetrically to the longitudinal axis of the reaction chamber.

In one embodiment, the fluid guide is shaped geometrically flatly relative to the longitudinal axis of the reaction chamber.

In a preferred embodiment, the fluid guide is shaped in ascending fashion geometrically to the longitudinal axis of the reaction chamber, preferably in elongated fashion, and has a tubular spigot, hereinafter called the protrusion of the fluid guide, or protrusion for short.

The length of the protrusion can be designed variably. Preferably, the protrusion protrudes into the floor region of the lower part of the reaction chamber. The inlet opening of the outlet pipe is located centrally on the longitudinal axis of the reaction chamber to the protrusion of the fluid guide. In one embodiment, the protrusion projects as far as the inlet opening of the outlet pipe.

In an especially preferred embodiment, the length of the protrusion is advantageously designed such that it ends in the narrowest part of the nozzle, namely at the location in the nozzle that has the smallest free cross section of the inner wall, in contact with the fluid, of the outlet pipe and that is thus the nozzle for attaining the Venturi effect. Advantageously, the flow dynamics treatment of the fluid medium is optimized by this position.

In a preferred embodiment, the fluid guide is displaceable and adjustable relative to the floor region of the housing and thus relative to the floor region of the reaction chamber along the longitudinal axis and thus advantageously adapts to the properties and treatment of the fluid medium.

Furthermore, the spacing between the fluid guide and the inlet opening of the outlet pipe is variably adjustable centrally along the longitudinal axis, so that the fluid guide, if there is a change in position of the outlet pipe, can advantageously be made to track along the longitudinal axis. Since the outlet pipe is also variably adjustable along the longitudinal axis, it is conversely possible for the outlet pipe, upon a change in position of the fluid guide, to be readjusted along the longitudinal axis.

The fluid guide is preferably adjustable and displaceable in the same way as the outlet pipe relative to its opening in the housing along the longitudinal axis of the reaction chamber, as a result of which the pressure and flow conditions in the reaction chamber can advantageously be optimized. To that end, the adjustment mechanism of the fluid guide is designed such that its readjustment or reregulation in an optimal negative pressure region for the diversion of the fluid eddy, generated by the reactor facility of the invention, into the outlet pipe is made possible.

According to the invention, by a change in direction, the fluid eddy at the fluid guide is diverted into the inlet opening of the outlet pipe by means of a ascending motion that is counter to what, in the installed state, is a downward-oriented translational and rotary motion along the longitudinal axis.

Because of the shape of the fluid-carrying rotationally symmetrical reaction chamber, translational and rotary motions of the at least one introduced volume flow of the fluid medium, which develops a fluid eddy, occur along the longitudinal axis. The fluid eddy in the process is guided in the flow direction in the installed state toward the lower end of the reaction chamber, around the outlet pipe, and takes on the motion of a descending helical line that is oriented downward in the flow direction. The result is the formation of a fluid eddy, which is guided in rotating fashion into the lower part of the reaction chamber and undergoes an acceleration.

Furthermore, the lower part of the reaction chamber in the longitudinal axis of the reactor facility tapers in the flow direction of the fluid medium; the fluid eddy is accelerated sharply. The kinetic energy of the elementary particles in the fluid eddy ascends because of the tapering of the lower part of the reaction chamber and leads to an increase in the reactivity of the fluid medium.

Advantageously, the translational and rotary motions are superimposed on one another. The inflow speed of the at least one fluid medium should be selected such that in flow terms a turbulent boundary layer can develop; the at least one fluid eddy generated is accelerated; and a high speed difference ensues.

Advantageously, a combination of translational motion and simultaneous rotary motion is selected such that in the event that there are a plurality of volume flows, they touch one another.

The structural design of the invention is selected such that upon flowing through the reaction chamber at a defined dynamic pressure, a speed with as high as possible a maximum value and as large as possible a gradient in the radial direction is imparted.

The flow conditions, required for producing as strong as possible an advantageous friction and centrifugal action and as great as possible shear stresses in the fluid eddy to be treated, are achieved by means of the structural design of the reactor facility. By the form of the reaction chamber, the fluid eddy of the fluid medium to be treated is steered in such a way that in the descending branch of the flow course, that is, between the at least one delivery opening with an ensuing fluid inlet region and the inlet opening of the outlet pipe, a fluid eddy is embodied. The flow speed of the fluid eddy has a pronounced gradient over its cross section in the radial direction.

Furthermore, the cross section of the reaction chamber in the lower part of the reaction chamber or in the floor region of the reaction chamber in the longitudinal section of the reactor facility in the flow direction of the fluid medium. By the location of the at least one delivery opening and the inlet opening of the outlet pipe, on the one hand shear stresses between the individual flow layers of the fluid eddy are produced. Such shear stresses are also produced between the walls of the reaction chamber, the outer wall of the outlet pipe secured in the reaction chamber, and the fluid eddy. The frictional forces, produced by the shear stresses and opposite to them, of the fluid eddy lead, because of a new arrangement of the bonds between the molecules of the fluid medium to be treated, to a change in the surface tension and a change in the viscosity of the fluid medium.

Advantageously, a separation of substances can be achieved because of the different specific weights of the substances found in the fluid medium, and is intensified by the superposition of the translational and rotary motion.

A grinding action is attained as well. The physically produced high speed difference between the individual layers of the fluid eddy lead to a mechanical disintegration of solid organic components, such as bacteria, algae and other microorganisms as well as inorganic components. The resultant debris is as a consequence broken down mechanically, chemically, and in the case of electrolysis, electrolytically. This mechanical breakdown of the organic and inorganic components takes place to a slight extent because of the geometry of the reaction chamber, even before the fluid eddy formed is diverted at the fluid guide.

Between the upper and lower parts of the reaction chamber, pressure differences occur, which advantageously contribute to producing a fluid eddy. The resultant pressures in the reaction chamber are dependent, among other things, on the design and form of the reaction chamber or the shape of the nozzle. In the floor region upstream of the inlet opening of the outlet pipe, a pilot pressure, which is preferably at >ca. 3-4 bar, a dynamic pressure increasing in the flow direction, and a resultant negative pressure or vacuum all prevail.

Because of the advantageous shape of the upper part of the reaction chamber, in comparison to EP 1 294 474 B2, less pressure and thus less energy is needed in order to put the fluid medium, flowing in through the at least one delivery opening, into rotation. On the other hand, because of the advantageous shape of the upper part of the reaction chamber, at the same required pressure and energy in comparison with EP 1 294 474 B2, a higher rpm speed and rotary speed of the fluid eddy are achieved.

The walls of the reaction chamber are machined in such a way that they have a lower coefficient of friction than before the machining and thus the fluid medium can be advantageously accelerated in the reaction chamber. The coefficient of friction is dependent on the corresponding material suitably used for the reaction chamber.

As a result of the design of the reactor facility of the invention, the fluid medium in the upper part of the rotationally symmetrical reaction chamber, on the basis of the principle of angular momentum, is guided in the form of a guided fluid eddy along the longitudinal axis in the flow direction into the lower part of the reaction chamber. It is advantageous here, and in comparison to EP 1 294 474 B2, only slight losses of flow energy occur. The angular momentum of the fluid medium varies only slightly.

In the lower part of the reaction chamber, the rotating fluid eddy is diverted toward the center of the flow at the fluid guide and is diverted there in an opposite ascending direction along the longitudinal axis of the reaction chamber, preferably into the nozzle of the outlet pipe. Preferably, at the fluid guide the rotating fluid eddy arriving from above is diverted oppositely to its original direction. In that process the fluid eddy abuts against the fluid guide, and an eddy indentation occurs. Very particularly preferably, the fluid eddy abuts against the protrusion of the fluid guide.

The centrifugal and centripetal forces and the frictional forces caused by shear stresses between flow layers moving at different speeds act variously strongly in the floor region of the lower part of the reaction chamber as well as on the variously heavy components contained in the fluid medium.

In the floor region, there is a strong centrifugal effect, because the inorganic and/or organic contaminants entrained as floating particles are driven, because of their high weight, from the center of the fluid eddy to its edge. The dissolved gaseous components, because of their low weight, are driven from the edge of the fluid eddy toward its center.

In the change of direction of the fluid eddy that takes place, because of the diversion in the floor region, the already-separated contaminants and media of different weights move again in the opposite direction, via the cross section of the fluid eddy.

Thus in the lower region of the reaction chamber, in the vicinity upstream of the inlet opening of the outlet pipe, at least two volume flows (of the fluid eddy arriving from above in the installed state and of the diverted fluid eddy) operate counter to one another. Upstream of the inlet opening of the outlet pipe, a lower pressure develops than in the rest of the reaction chamber.

As a result of the developing pressure conditions in the floor region of the reaction chamber as well as upstream of the inlet opening of the outlet pipe, the cell walls of the organic components contained in the fluid medium are made to burst open. Moreover, collision and friction of the impurities dissolved in the fluid medium cause the mechanical and physical destruction and comminution of these impurities. The impurities dissolved in the fluid medium include organic and/or inorganic substances, substance compounds, microorganisms, and botanical and/or organic living things, such as germs, bacteria, fungi or algae among one another, as well as the individual particles, atoms and atomic groups, and molecules of the fluid medium.

The high kinetic energy, the energy input from friction of the individual layers in the at least one fluid eddy, and the attendant centrifugal force and/or translational force result in an optimal energetically stable and balanced status and bond thus effect a change in the normally present surface tension and viscosity. This rearrangement of the grid structure is due to the breaking up and re-formation of the existing covalent bonds resulting from their different atom masses and thus different mass inertia as well as to collisions of the individual particles, atoms and atom groups as well as molecules with one another.

The fluid medium treated according to the invention maintains its surface-tensed status over a relatively long period of time.

By the thus-attained rearrangement of the molecular structure, dissolved gases or volatile impurities dissolved in the fluid medium are released, so that degassing of the fluid medium occurs in addition. As a result of this degassing, additionally unwanted reactions of these entrained substances in the fluid medium itself to be treated, other entrained substances, or substances which come into contact with the fluid medium, such as measurement sensors or pipe walls, are reduced or prevented.

The centrifugal force and/or translational force should be selected such that breaking up of the substance bonds and molecular chains of the impurities dissolved in the fluid medium occurs, and these are mechanically destroyed or comminuted and/or the existing impurities or the atoms, molecules or molecular compounds of the fluid medium are at least partially ionized or radicalized.

By the geometric design of the rotationally symmetrical reaction chamber, the requisite high speeds that are strongly affected by a gradient are generated in the fluid medium. These speeds are needed to produce the physical effects, that is, to disintegrate decontsolid components and to rearrange molecular bonds, and for tripping and accelerating the chemical processes by the delivery of energy. The quantity and quality of the mechanical destruction and comminution can be adjusted by varying the speeds, depending on the fluid medium on hand and on the impurities dissolved in it. The quantity and quality are dependent on the resistance of the impurities to mechanical stresses.

Entrained substances are dissolved out of the grid structure of the fluid medium and/or separated from the fluid medium via the centrifugal force because of the different specific substance weights and can after that, on being carried out of the reaction chamber, be filtered out, sedimented or otherwise bound through the outlet pipe. By the comminution of substances, the electrical conductivity of the fluid medium can be increased.

By the design of the outlet pipe in the lower region, near the mouth, as a nozzle for attaining the Venturi effect in combination with the fluid medium delivered to the reaction chamber, the fluid eddy, which develops as a hollow eddy, in the outlet pipe is highly accelerated and has low surface tension. As a result, in liquid fluid media the vapor pressure in the core region can be reached or undershot. The result is a flow with highly different speeds in the core region and the peripheral region.

A hollow eddy is formed, in the center of which a core of a fluid medium that is lighter than in the rest of the flow field forms. At increasing speeds, eddy flows with eddy filaments or eddy tubes are produced, or, depending on the type of fluid medium, a rotation-free fluid eddy with an eddy core, also known as a potential eddy, is produced. In this process, once again shear stresses in the flowing fluid medium are achieved, which further promote the physical and chemical processes.

This hollow eddy with an eddy core, which forms a vacuum, is superimposed on the vacuum development occurring in the nozzle with a Venturi effect because of the Venturi effect.

By means of the superimposed and intensified vacuum formation in the nozzle region, germs and bacteria that have an internal cellular pressure (turgor) are torn up and oxidized. In the vacuum region, dissolved gases in a liquid fluid medium are dissolved and degassed because of the existing fluid eddy.

If in counterflow via the fluid guide, which in the center along the longitudinal axis can have a through bore of adjustable flow, a gas can be delivered to the reaction chamber as an additional fluid and thus mixes with the fluid eddy and is dissolved markedly better in the fluid medium because of the altered molecular structure of the fluid medium.

The device of the invention and the method of the invention are especially advantageous because an effective, economical process can be performed at low cost in terms of both space and funds, without adding environmentally harmful chemicals and without irradiating the fluid medium or taking other potentially dangerous actions. In the course of this process, depending on the intended use, liquid waste can be decontaminated and disinfected and used again, and water reservoirs are kept germ-free. In regions with a shortage of water, a supply of fresh water can be ensured; the wetting power of various liquids can be increased. The use of detergent chemicals for various cleaning purposes in the household and industry can be significantly lessened, and the environmental strain can be reduced. Thick liquid media can be diluted purely mechanically, without a chemical change.

In a preferred embodiment, the fluid guide has at least one through bore along the longitudinal axis, and the longitudinal axis of the through bore coincides with the longitudinal axis of the rotationally symmetrical reaction chamber.

Through the through bore along the longitudinal axis of the fluid guide, the reaction chamber can advantageously be preferably supplied with at least one additional fluid medium, which is aspirated as needed directly and automatically into the lower part of the reaction chamber by means of the negative pressure prevailing in the floor region of the reaction chamber. Advantageously, the fluid eddy is thus diverted at the fluid guide and can also be mixed with an additional fluid medium.

In one embodiment, the fluid guide is shaped as geometrically flat relative to the longitudinal axis of the reaction chamber and has a through bore. In a preferred embodiment, the fluid guide is shaped as ascending geometrically, preferably longitudinally, relative to the longitudinal axis of the reaction chamber and has a tubular spigot, hereinafter called the protrusion of the fluid guide, or protrusion for short, which has a through bore.

If the length of the protrusion of the fluid guide is shaped such that it ends directly in the nozzle for attaining the Venturi effect, the fluid medium additionally aspirated through the through bore is thus aspirated directly into the interior of what in the installed state is the lower region, near the mouth, of the outlet pipe.

In the elongated embodiment of the fluid guide with the through bore along the longitudinal axis, the intended delivery or aspiration of an additional fluid medium directly through the inlet opening of the outlet pipe, into its lower region near the mouth, is advantageous. Preferably, the lower region of the outlet pipe near the mouth is embodied as a nozzle for attaining the Venturi effect, as a result of which the additional fluid medium is aspirated directly into the nozzle for attaining the Venturi effect.

The length of the protrusion can be designed in variable ways. In a particularly preferred embodiment, and for the highest efficiency of the reactions, the length of the protrusion is advantageously designed such that it ends in the narrowest part of the nozzle, that is, the place in the nozzle having the smallest free cross section of the inner walls, in contact with fluid, of the outlet pipe. The flow dynamics treatment of the fluid medium is advantageously optimized in this position.

The addition of media for chemical secondary reactions in the outlet pipe is done by pressure or advantageously by using the negative pressure in the nozzle for attaining the Venturi effect.

In one embodiment, an additional fluid medium is delivered to the reaction chamber. That medium can be aspirated through the through bore of the fluid guide, or it can reach the adjoining fluid inlet region of the upper part of the reaction chamber via the main inflow or other supply lines via the at least one delivery opening.

In one embodiment, a plurality of additional fluid media are delivered to the reaction chamber. These media can all be aspirated through the through bore of the fluid guide, or they can reach the reaction chamber via the main inflow or other supply lines via the at least one delivery opening. In a further embodiment, the fluid media reach the reaction chamber through the fluid guide as well as via the main flow or other supply lines via the at least one delivery opening. Also, solid materials dissolved in the additional fluid medium can be aspirated into the reaction chamber through the through bore and/or the at least one delivery opening.

In one embodiment, the at least one additional fluid medium can be the same medium that is delivered to the reactor facility through the at least one delivery opening in the upper part of the reaction chamber. In alternative embodiment, the at least one additional fluid medium is some other fluid medium than the one which is delivered to the reactor facility through the at least one delivery opening in the upper part of the reaction chamber. As a result, a targeted dosage of further additional fluid media is possible.

By means of the additionally delivered fluid media, chemical or biological reactions can be preferentially improved or accelerated, in that substances affecting chemical or biological reactions, such as oxidation or precipitation agents, are made to react. As additional delivered fluid media, oxidants such as ozone, hydrogen peroxide, or oxygen or other additional fluid media serving as reaction partners and*catalysts, which are delivered to the reaction chamber from a reservoir, can be considered.

If the additional delivered fluid medium is gaseous and an oxidant, such as oxygen or from oxygen from the (ambient) air, then it can be ionized by a preceding pretreatment device or converted into radicals such as ozone, to improve the oxidation properties. As a result, hydrocarbon compounds and/or other organic compounds, such as germs, bacteria and extremely small organisms, can be oxidized. The result among other things is water and carbon dioxide; that is, with organic substances, denaturing takes place.

A significant increase in the reaction speed is brought about by the dosed feeding in of oxidants or other additional fluid media serving as reaction partners.

By means of the electrolysis, oxidizable substances in the fluid medium are oxidized. By applying a direct or alternating voltage to the first and second electrodes, electrolysis of the substances dissolved in the fluid medium takes place in the reaction chamber and are immediately converted, broken down and oxidized. The electrolysis preferably involves technical electrolysis. If aqueous fluid media are used, water electrolysis is a secondary reaction.

In the lower part of the reaction chamber, especially in the region of the outlet pipe near the mouth, the cell walls of the germs and bacteria are ruptured by their own internal cellular pressure (turgor) by means of the vacuum and are in the form of hydrocarbons in the fluid medium.

The reactor facility of the invention is designed such that a single-chamber electrolysis can be achieved with two electrodes. The electrodes are formed by fluid-carrying components of the reactor facility.

The reactor facility of the invention preferably has two electrodes, which protrude into the reaction chamber or are parts of the reaction chamber. The electrodes are in contact with the fluid medium or in electrical contact with the reaction chamber and furthermore are exposed to varying pressure conditions. In one embodiment, parts of the fluid-carrying components of the reactor facility of the invention are embodied as a first and second electrode.

The at least one delivery opening, the fluid-carrying walls of the reaction chamber, the outlet pipe, or the fluid guide can be embodied entirely or partially as a first electrode. Preferably, at least the outlet pipe is embodied partially as the first electrode.

Furthermore, the at least one delivery opening, the fluid-carrying walls of the reaction chamber, the outlet pipe, or the fluid guide can be embodied entirely or in part as the second electrode. Preferably, at least a part of the inner walls, in contact with fluid, of the housing and thus a portion of the fluid-carrying walls of the reaction chamber and/or the fluid guide is embodied as the second electrode.

In a further embodiment, the embodiment of the components or parts of the reactor facility as a first and second electrode is also possible in reverse order. For example, the outlet pipe is at least partially embodied as the second electrode, and at least a part of the inner walls, in contact with fluid, of the housing and/or the fluid guide is embodied as the first electrode.

In one embodiment, the outlet pipe is at least partially embodied as the first electrode. Preferably, only part of the outlet pipe is embodied as the first electrode. Especially preferably, the lower part of the outlet pipe is embodied as the first electrode. Very particularly preferably, the interior of the lower region, near the mouth, of the outlet pipe, or in other words the location with the smallest free cross section, and thus the nozzle for attaining the Venturi effect, is embodied as the first electrode. In an alternative embodiment, the entire outlet pipe is embodied as an electrode.

At least a part of the reaction chamber, preferably the fluid-carrying walls, in contact with fluid, of the reaction chamber, is embodied as the second electrode. Preferably, the fluid guide is embodied as the second electrode, which is electrically insulated in fluid-tight fashion from the remainder of the housing. Advantageously, the housing can then be grasped. In an alternative embodiment, the entire reaction chamber—that is, all of the walls of the reaction chamber that are in contact with fluid—is embodied as the second electrode. In a further alternative embodiment, the entire fluid guide is embodied as the second electrode. In a further alternative embodiment, the entire housing, including the fluid guide, is embodied as the first electrode.

In a particular embodiment, and to ensure high efficiency of the ongoing reactions, the first and second electrodes are located at the least possible spacing from one another. This applies to the case in which the nozzle for attaining the Venturi effect is embodied as the first electrode, and the fluid guide with an elongated protrusion is embodied as the second electrode, and the elongated protrusion of the fluid guide ends at the narrowest point (that is, the location in the nozzle having the smallest free cross section).

In a special embodiment, in which the flow-dynamically/electrolytic treatment of the fluid medium is advantageously optimized, the nozzle for attaining the Venturi effect is embodied as the first electrode, and the fluid guide with an elongated protrusion is embodied as the second electrode, and the elongated protrusion of the fluid guide is located at the narrowest point (smallest free cross section) of the lower region, near the mouth, of the outlet pipe, or in other words of the nozzle for attaining the Venturi effect. In this configuration, electrolysis thus takes place after the diversion of the volume flow at the narrowest point of the nozzle (having the smallest free cross section); that is, at the location where the first and second electrodes have the smallest spacing apart from one another.

Also at that location, the electrode surface area required for the electrolysis for the efficiently operated device of the invention is very small. Advantageously at this location, electrolysis can be performed in the lower part of the reaction chamber. By this electrolysis, compounds that are difficult to split and that could not be ruptured solely by the eddy diversion at the fluid guide (and thus by the purely flow-dynamics treatment), are ruptured.

In an alternative embodiment, the fluid-carrying walls of the reaction chamber are embodied as the first and second electrodes and are electrically insulated from one another in fluid-tight fashion and located spaced apart from one another. Advantageously, the chemical compounds are thereby dented by electrolysis with the first and second electrodes before the eddy forms, so that the ensuing flow-dynamics treatment of the fluid eddy in the lower region of the reaction chamber, or in the nozzle of the outlet pipe, decomposes and/or oxidizes the dented chemical compounds further.

Furthermore, by electrolysis, ozone can already be released at the at least one delivery opening, and after that, after reaching the fluid guide, the fluid medium is further treated by oxygen additionally introduced into the reaction chamber.

The first and second electrodes are electrically insulated from one another in fluid-tight fashion. The insulation is done by means of an insulation layer, which is preferably plastic. The insulation thus surrounds the first and second electrodes, and the insulation of the first electrode and the insulation of the second electrode are not in any physical contact with one another.

In one embodiment, the insulation surrounds the outlet pipe and/or the fluid guide. In a further embodiment, the insulation surrounds the outlet pipe at its upper part in the vicinity of the outlet opening and/or surrounds the fluid guide. In a particular embodiment, the insulation layer surrounds the fluid guide and the outlet pipe. In an alternative embodiment, there is no insulation layer.

Advantageously, the first and/or second electrode is can be removed or replaced for cleaning or or in the event of defects or for cleaning the reaction chamber. In a particular embodiment, parts of the first and/or second electrode are replaceable.

The electrode material and its properties, such as electrical conductivity or corrosion resistance, have considerable influence on the processes taking place in the reactor facility.

The first and second electrodes required for the electrolysis consist of electrically conductive metals, electrically conductive alloys, or other electrically conductive materials.

Platinum has proved itself especially well as a metal electrode material. Other suitable metals for use as the first and second electrodes are yttrium, aluminum, titanium, copper, silver, gold, or other metals. As electrically conductive alloys, stainless steel for instance can be used. Possible examples of electrically conductive materials to be considered are graphene, graphite or carbon. Boron-doped diamond has proven itself as an electrode material with high long-term stability.

Preferably, the first and second electrodes are of the same material or are coated with the same material. The two electrodes can also each consist of different materials.

Furthermore, the first and second electrodes in the core can consist of an insulating material, such as plastic, which has an electrically conductive coating of an electrically conductive metal, an electrically conductive alloy, or an electrically conductive material. Platinum has proved itself especially well as a metal electrode coating. Other suitable metal coatings are aluminum, titanium, copper, silver, gold, or other metals. Stainless steel, for example, can be used as electrically conductive alloy coatings. As conductive material coatings, graphene, graphite or carbon can be considered. Preferably, both electrodes have the same coating. The electrodes can also be coated with different materials.

In one embodiment, the surface of the electrodes is electrically conductive. In a further embodiment, as electrodes, only the reaction chamber walls on the side in contact with fluid are electrically conductive. In an alternative embodiment, only some of the reaction chamber walls on the fluid contact side are electrically conductive as electrodes.

For operating the reactor facility, at least one regulating or control unit and a power unit are used, which are connected to the reactor facility and carry out the electrolysis. The regulating or control unit adapts, by means of a regulating or control algorithm, to the instantaneous requirements on the basis of appropriate, process-relevant parameters. A power unit is also connected to the reactor facility.

In a preferred embodiment, the electrodes have electrical lines and connections, by which they are connected to the at least one regulating or control unit and to a power unit. The first electrical connection is connected to the first electrode, and the second electrical connection is connected to the second electrode.

The regulating or control unit and the power unit are also designed such that electrolysis can be achieved in the reactor facility by applying direct or alternating voltage between the first and second electrodes and measuring a current. In a particular embodiment, a voltage source and a current meter serve as the regulating or control unit. In a further embodiment, a potentiostat is connected as a regulating or control unit to the reactor facility.

The electrolysis is attained in that a voltage of opposite polarity is applied by the regulating or control unit and the power unit to the first and second electrodes, independently of one another, via the corresponding first and second electrical connections and corresponding electrical lines between the first and second electrical connections. The result of this is that an electrical field develops between the two electrodes, and an electrical current, which is measured with the regulating or control unit, flows between the first and second electrodes. The applied voltage is either direct or alternating voltage.

By means of the regulating or control unit and the power unit, a direct voltage and/or alternating voltage can be applied to the first and second electrodes. Depending on the electrical polarity or the applied (direct) voltage, the first electrode acts as a cathode and the second electrode acts as an anode, or vice versa. In the case of conductive fluid media, the applied (direct) voltage at the first and second electrodes is approximately 4 to 5 V. Between the first electrode and the second electrode, an electrical current of ca. 30 to 120 A flows. Still other voltage values can be applied to the electrodes, which in turn leads to different current flows between the first and second electrodes.

If a negative direct voltage is applied to the first electrode, that electrode acts as a cathode, while a positive direct voltage is applied to the second electrode and it acts as an anode. If a negative direct voltage is applied to the second electrode, it acts as a cathode, while a positive direct voltage is applied to the first electrode and it acts as an anode.

In one embodiment, the direct voltage applied to the first and second electrodes is reversed in polarity by the regulating or control algorithm. Thus during a measurement procedure, the first electrode acts as a cathode or anode, and the second electrode acts as a cathode or anode.

In a preferred embodiment, the regulating or control unit applies a reverse-polarizable direct voltage of opposite polarity to the first and second electrodes, and the applied voltages are variable in their intensity.

Advantageously, the electrodes are protected by this change of direct voltage polarity, because a galvanotechnical process, that is, the electrochemical deposition of metal sediments, is avoided, and the electrodes experience less dissociation. Since the device of the invention involves a single-chamber system, by means of the change of direct-voltage polarity, the deposition of metals on the electrodes is advantageously avoided as well, and as a result a consistent power and efficiency of the reactor facility are ensured. The direct voltage is reversed in polarity after a certain period of time, for a certain period of time. This depends on the fluid medium that is to be treated. In an alternative embodiment, the duration until the next change of polarity and the duration of the electrolysis with opposite polarity are variably adjustable.

In a further embodiment, first a direct voltage is applied to the first and second electrodes and after that an alternating voltage is applied to the first and second electrodes, or vice versa. In a further embodiment, an alternating voltage is superimposed on the direct voltage applied between the first and second electrodes.

In an alternative embodiment, the reactor facility of the invention is operated at an alternating voltage of preferably 1-5 Hz and very preferably 1-2 Hz applied between the first and second electrodes. The alternating voltage is variable in its intensity.

The type and intensity of electrical voltage applied to the first and second electrodes affect the processes which take place in the reactor facility. Advantageously, by the combination of applied direct voltage and superimposed alternating voltage, the conduction, efficiency and conversion rate of the electrolysis can be increased.

Depending on the property of the fluid medium (such as the degree of contamination, the surface tension, or the viscosity), the applied voltage between the first and second electrodes that is required for the electrolysis varies. By means of the applied direct and/or alternating voltage, the selection of triggering components for the reactor facility differs structurally, as does the choice of the power supply unit, for example.

Advantageously, the electrolysis taking place in the reactor facility makes for faster and more-efficient treatment of the fluid media. The prerequisite for this is that the fluid medium for the electrolytic treatment is polarizable. The prerequisite for the electrolysis is the presence of a first and second electrode as well as a conductive electrolyte, which exists because of the fluid medium to be treated.

The reaction chamber acts as the electrolysis cell. If an electrically conductive fluid medium is passed through the reaction chamber, then in the vicinity of the region near the mouth of the lower part of the outlet pipe in the floor region of the reaction chamber, a flow-dynamic and electrolytic treatment of the fluid medium takes place. By means of the device of the invention and the combined method of the invention, the fluid media delivered to the reactor facility are advantageously disinfected and biologically cleaned, which is associated with the breaking apart of chemical bonds.

The combination of the flow-dynamics treatment of the fluid medium, which is set into rotation in the rotationally symmetrical reaction chamber, as a result of which the first foreign substances are already dented, advantageously leads with the electrolytic treatment to easier splitting, destruction and breakdown of foreign substances dissolved in the fluid medium. By means of the additional electrolytic treatment of the fluid medium, in contrast to the purely flow-dynamics treatment, the reaction speed is advantageously increased by a factor of 10 to 100.

The organic components of the fluid medium, which may already have been flow-dynamically treated, are immediately electrolytically converted by the electrolysis, and advantageous chemical endothermic reactions are brought about and speeded up by the electrolysis.

The electrolysis advantageously enhances the effect and the yield of the chemical conversion in the reactor facility. Advantageously, as a result of the additional electrolytic treatment, a power increase by a factor of 10 to 100 takes place, in comparison to the purely flow-dynamics treatment of the fluid medium.

By the additional electrolytic treatment of the fluid medium, all the chemical compounds in the fluid medium can advantageously be dented and decomposed to the extent of an atomic and molecular level.

Furthermore, because of the additional electrolytic treatment of the fluid medium, more-stable chemical compounds, such as a compounds with double bonds, would be broken down with a higher reaction speed and thus more efficiently than if they were treated flow-dynamically.

The electrolysis can be subdivided into technical electrolysis and a process that is a secondary reaction. The process occurring as the secondary reaction is dependent on the fluid medium to be treated.

In the technical electrolysis, organic and inorganic ingredients in fluid media are electrochemically broken down and decomposed. Especially microorganisms and organic materials, such as bacteria, fungi, germs and algae, but also proteins, are broken down and decomposed, and the fluid media are cleaned and/or disinfected by chemical oxidation or reduction of the entrained substances and substance compounds. Thus microbiological contaminants in the fluid media are effectively processed, and recontamination of the fluid medium is averted.

By the technical electrolysis, along with the organic contaminants, chemical compounds that split with difficulty are also broken open. In the process, preferably in aqueous fluid media, in addition to the flow-dynamics treatment, oxygen or ozone as an oxidant is released, which ensures radicalization of the components.

By the application of a direct voltage, the fluid medium is broken apart into its constituent parts. The ozone is produced by tearing apart the fluid medium electrolytically beyond a certain current intensity. In the technical water electrolysis, advantageously by the superposition of the direct voltage applied between the first and second electrodes with an alternating voltage, as a function of the electrode material (such as graphite or carbon), an ozone generation of up to 37% is achieved. In the process, free radicals form. It is additionally possible to increase the efficiency of the device by supplying an oxidant, as an additional fluid medium, into the reaction chamber from outside through the through bore of the fluid guide.

The electrolytic reaction in the fluid medium is so strong that it itself attacks inorganic substances that were dissolved in it but had not yet been decomposed by a purely flow-dynamic treatment. As a consequence, with the oxidants that are released (oxygen that is released or the oxygen which was already generated by the flow-dynamics treatment), fast chemical reactions, preferably oxidations, take place, By the additional energy input from the electrolysis, it is possible to oxidize or split organic chemical compounds, such as highly condensed aromatic hydrocarbons, of the kind contained for instance in gasolines, as well as chemical compounds with double bonds and inorganic oils. The breakdown of heavy oils takes place over a longer period of time than for instance the breakdown of light oils. Acids such as sulfuric acid or succinic acid, or chlorinated hydrocarbons such as chloroform, can advantageously be treated and broken down electrolytically in the reaction chamber as well.

Furthermore, by the technical electrolysis, toxic heavy metals dissolved in the fluid medium to be treated can be cleaned. They become nontoxic salt compounds, such as cadmium salt, and are transported with the treated fluid medium through the outlet opening of the outlet pipe and out of the reactor facility. Next, the heavy metal salts formed can be filtered. In a further embodiment, bromine compounds can be split up.

By applying a direct and/or alternating voltage to the first and second electrodes, a (technical) electrolysis of the dissolved substances takes place in the reaction chamber, and they are immediately converted, broken down and oxidized. Even organic compounds or organisms that have no cellular pressure of their own (mold, fungi, yeasts) are broken open by the electrolysis and advantageously oxidized in the nozzle for attaining the Venturi effect. There is additionally the effect of the surface tension change in the fluid medium, which in the outlet pipe and the adjoining pipelines outside the reactor facility strips off adhering organic or inorganic compounds, which are then delivered back to the reactor facility. Furthermore, the water-soluble residues formed by the electrolysis (mostly salts from the electrochemical reaction) in the fluid medium are better precipitated out and collected, for instance with filters, since the water is "thinner" because of the drop in the surface tension and the change in viscosity.

In the case of the hydrocarbons dissolved in the fluid medium, the hydrocarbons are broken down into water and carbon dioxide. The gaseous carbon dioxide dissolved in the fluid medium is transported away out of the reaction chamber with the fluid medium through the upper part of the outlet pipe. Thus the flow-dynamically/electrolytically treated volume flow leaves the reactor facility virtually without residue ("virtually", since there is no process in nature that can escape the chemical balance expressed by action=reaction).

If the fluid medium to be treated is an aqueous solution, or in other words contains water, then as a secondary reaction to the ongoing technical electrolysis, water electrolysis will take place, in which gaseous hydrogen escapes from the cathode and gaseous oxygen escapes from the anode.

The total reaction equation for the water electrolysis is as follows:

$$2H_2O \rightarrow 2H_2 + O_2.$$

Gaseous hydrogen escapes from the cathode, at which the reduction reaction takes place, and electrons are given off, lowering the oxidation number, into the fluid medium (the electrolytes), in order to reduce protons:

$$2H_2O + 2e^- \rightarrow 2OH^-(aq) + H_2(g).$$

Gaseous oxygen escapes from the anode, at which the oxidation reaction takes place, and electrons are received from the electrode, raising the oxidation number:

$$2H_2O \rightarrow 4H^+(aq) + 4e^- + O_2(g).$$

In an alternative version of the invention, at least one gaseous substance, or gaseous mixture, is treated as the fluid medium in the reactor facility. Gases do not have the electrical conductivity of liquids. Therefore the applied (direct) voltage between the first and second electrodes must be multiple times higher than with liquids.

All the gaseous fluid media flow through at least one delivery opening into the reaction chamber. In a particular embodiment, at least one gas is carried through the at least one delivery opening into the reaction chamber and forms a gas stream.

In a particular embodiment, the elongated fluid guide is the second electrode and ends at the narrowest point (smallest free cross section) of the interior of the lower region, near the mouth, of the outlet pipe, which is the nozzle for attaining the Venturi effect, which is embodied as the first electrode. Advantageously, the flow-dynamic and electrolytic treatment of the gas is optimized as a result of this position.

At this position, in a nozzle for attaining the Venturi effect, a plasma, preferably a low-temperature plasma, is ignited. This is achieved at high applied voltages in the vicinity of 3,000 to 60,000 V, preferably 3,600 to 55,000 V, because of the high resistance of air. A relatively slight current of ca. 1 A to 20 A flows. If the current flow is sufficiently high, the electrodes heat up and an arc is created. Advantageously, the low-temperature plasma produced in the nozzle for attaining the Venturi effect can be used for oxidation of gas components. The plasma temperatures that occur are in the range from ca. 120 to 180° C.

In an alternative embodiment, the electrolysis, depending on the definition of the location of the electrodes, is not simultaneous with the effect of the flow-dynamic treatment, but instead occurs already before the entry of the eddy diversion of the fluid medium into the nozzle for attaining the Venturi effect. This is the case, for instance, whenever the entire outlet pipe is designed as the first electrode, and the entire housing is designed as the second electrode.

In a further embodiment, a plurality of fluid-carrying components of the reactor facility are designed as the first and second electrodes. Then they each have the requisite number of electrical connections and electric lines for one or more regulating or control units and power units.

In a preferred embodiment, a plurality of regions, where electrolysis takes place, are set up simultaneously. Thus electrolysis preferentially takes place simultaneously at various locations in the reaction chamber, as a result of which the efficiency of the chemical reactions is advantageously increased.

If the fluid medium to be treated is a liquid, it must be conductive in order to perform an efficient, energy-saving electrolysis with a preferably low applied voltage between the first and second electrodes. This is already the case as a result of the contamination of the liquid with organic or inorganic components. In order to guarantee a constant conductivity for an efficient, energy-saving electrolysis in the case of aqueous fluid media, the aqueous fluid medium to be treated is advantageously mixed with a conducting salt. The conducting salt is advantageously, for example, cooking salt that is conventionally available on the market. The conducting salt is carried through the through bore of the fluid guide along the longitudinal axis into the reaction chamber. In a preferred embodiment, it is already in the main inflow or other inflow lines into the reaction chamber that the conducting salt is added into the aqueous fluid media to be treated.

In principle, the electrolytic reactions are dependent, among other things, on the electrolytes used (that is, the fluid medium), the applied voltages, and the material comprising the electrodes.

In an alternative embodiment, the reactor facility is operated as a electroplating cell, as a result of which, because of the chemical reactions that readily take place, electrical energy is released, which is picked up at the electrical connections of the first and second electrodes.

It should be noted that the fluid media delivered into the reaction chamber differ in their properties, such as surface tension or viscosity, and thus variously produced different chemical reactions and measurement parameters in the reactor facility of the invention. The measurement parameters thus vary depending on the fluid media used. Moreover, the output of the reactor facility that is achieved and the measurement parameters depend on the electrode material and the voltages applied to the electrodes.

Advantageously, a catalyst can be added to speed up the chemical reactions in the reactor facility. In a preferred embodiment, at least some of the fluid-guiding walls of the reaction chamber are catalytically coated in the flow direction of the fluid medium, or the fluid-carrying walls of the reaction chamber consist entirely of a catalytic material.

Furthermore, the chemical reactions can be accelerated by increasing the temperature of the fluid media in accordance with the thermal state equation of ideal gases. Advantageously, the reaction speed is higher because of the higher energy input from increasing the temperature. Additionally, already-warmed fluid media, such as warm or hot waste water, can be delivered to the reactor facility and treated flow-dynamically and electrolytically. In an alternative embodiment, the reactor facility is connected to the heater, such as a heating plate, and to an associated heat control for warming the fluid media.

Furthermore, peripheral components such as hoses or pipes for transporting the fluid medium, pressure valves such as overpressure valves, flow splitters, and pretreatment units can be connected to the reactor facility of the invention. The use of pumps and/or compressors in conjunction with the adjustability of the outlet pipe and of the free cross section of the inlet opening of the outlet pipe also generates the necessary dynamic pressure.

In one embodiment, a device for measuring the pH value is connected to the reactor facility. In one embodiment, the reactor facility is used in an open pipeline system. Thus the pH value of the fluid medium can advantageously be measured after the flow-dynamically/electrolytic treatment.

The gases occurring during the flow-dynamically/electrolytic treatment of the fluid medium, such as $H_2$ and $O_2$, are carried away, out of the outlet opening of the outlet pipe and out of the reactor facility, and neutralized.

In an alternative embodiment, the reactor facility is used in a closed circulation system. The gases, such as $H_2$ and $O_2$, that occur during the flow-dynamically/electrolytic treatment are carried away with the fluid medium by rotary motion from the outlet opening of the outlet pipe and neutralized. In one embodiment, the gases that occur and have been carried away are collected in a device for separate collection. Preferably, these are special holding tanks for gases. Advantageously, a detonating gas reaction can be avoided by means of the separate collection as well as an ensuing neutralization.

In a particular embodiment, the collected gases are used further and for instance are further used advantageously for fuels or heating substances, such as methane, methanol, or benzene.

The most important areas of use of the method of the invention or the fluid media treated with the device of the invention are industry, commerce, private households, food production, agriculture and forestry, the waste and disposal industry, cleaning technology, disinfection, canning, machine construction, electronics, medicine and therapy, the construction industry, and energy technology.

The device and method of the invention are preferably used for pretreatment, processing, sterilization, disinfection and/or initiation of mechanical, physical and chemical reactions of and in fluid media. Preferably, this involves aqueous fluid media.

According to the invention, the terms pretreatment, processing, sterilization, disinfection, and/or initiation of mechanical, physical and chemical reactions are understood to mean the cleaning and cleansing of fluid media, in which the portion of pollutants is reduced. Pollutants are organic or inorganic components or microorganisms, which can also be toxic, that are dissolved in the fluid medium.

For instance, hydrocarbons, germs, fungi, algae and bacteria found in aqueous solutions are thus destroyed by causing the organic components to burst, and poorly soluble and toxic inorganic components are destroyed in the process. Especially preferably, drinking water, industrial water, process water, waste water or gray water is pretreated, processed, and/or disinfected. Long-chain molecular compounds can also be comminuted.

For example, the water in swimming pools is disinfected thereby. The device and method of the invention can advantageously be employed in self-sufficient of drinking water supply systems but also in (mobile) processing waste water in mobile homes and in processing waste water in remote mountain villages or in independent vacation camps.

The device and method of the invention are preferably used for treating waste water, especially private, industrial or community waste water. For instance, hydrocarbon compounds dissolved in such water are at least dented and then consumed by other bacteria. Additionally, with the device and method of the invention, chemically burdened waters can be cleaned. Even industrially produced soapy water is thus cleaned.

In slaughterhouses, slaughterhouse waste water that is dirty and contains protein can be processed with the device and method of the invention. Advantageously, the COD and BOD values are reduced in the process by 80-90%.

Waste waters that contain minerals, of the kind that occur for instance at automobile service stations, (car) wash facilities, industrial wash facilities, and organically highly polluted waste waters, as occur in biogas systems, are advantageously cleaned with the device and method of the invention. Tensides occurring in waste waters can be cleaned and processed as well.

Furthermore, lubricant oil emulsions as well as heavy oils can also be cleaned with the device and method of the invention.

When parts of the auto body are shaped, the sheet metal painted with grease has to be cleaned again with hot water before the parts are painted. The cleaning water must likewise be cleansed of greases and tensides. This processing of the residue water that occurs in the shaping of metal bodies after the metal has been washed can likewise be achieved by the device and method of the invention.

Additionally, gaseous or liquid fuels that are preferentially based on vegetable oils can also be treated.

Special advantages of the device and method of the invention are that at little expense for space and monetarily, without adding environmentally harmful chemicals and without irradiating the fluid medium, or other potentially dangerous provisions, an effective, economical process can be performed, the outcome of which is that depending on the intended use, waste waters can be detoxified and disinfected and re-used; water reservoirs can be kept germ-free; in areas where water is scarce a supply of fresh water can be ensured; the wettability of various liquids can be increased; the use of detergent chemicals for various cleaning purposes in the household and in industry can be significantly reduced; and thus the environmental burden can be reduced or thick fluid liquid media can be diluted, without chemical alteration, purely mechanically.

EXEMPLARY EMBODIMENTS

The invention will be described below in further details by means of exemplary embodiments. The exemplary embodiments are intended to describe the invention without restricting its scope.

The invention will be described in further detail with the aid of drawings. In the drawings.

Figure 1:
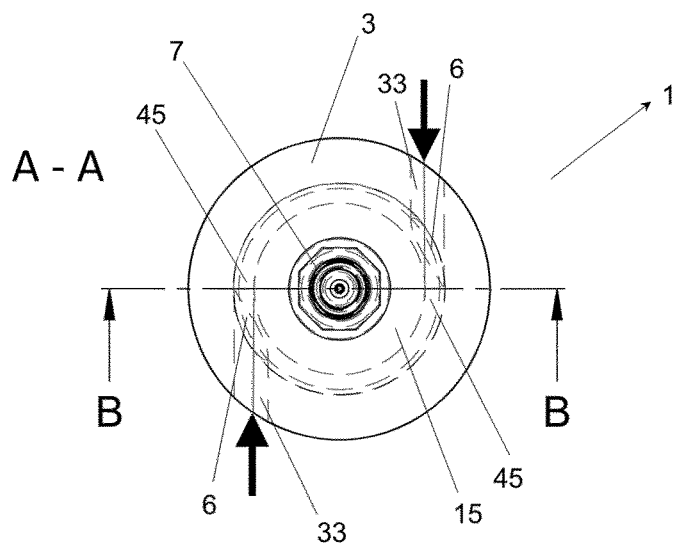
FIG. 1 is a plan view, in cross section along the sectional plane A-A, onto the reactor facility of the invention.

FIG. 1 in plan view and in cross section along the plane A-A shows the reactor facility 1 of the invention with the upper part of the housing 3 and the outlet pipe 7. Two inlet pipes 33 that in longitudinal section of the reactor facility 1 are opposite one another along the plane B-B discharge, in the view along the plane A-A, tangentially to the inner surface of the upper part of the reaction chamber 15 and form two delivery openings 6, which in section have an elliptical surface with the inner surface. The two arrows before the respective delivery openings 6 represent the flow direction of the fluid medium. The delivery openings 6 are each adjoined by the fluid inlet regions 45 in the flow direction.

Figure 2:
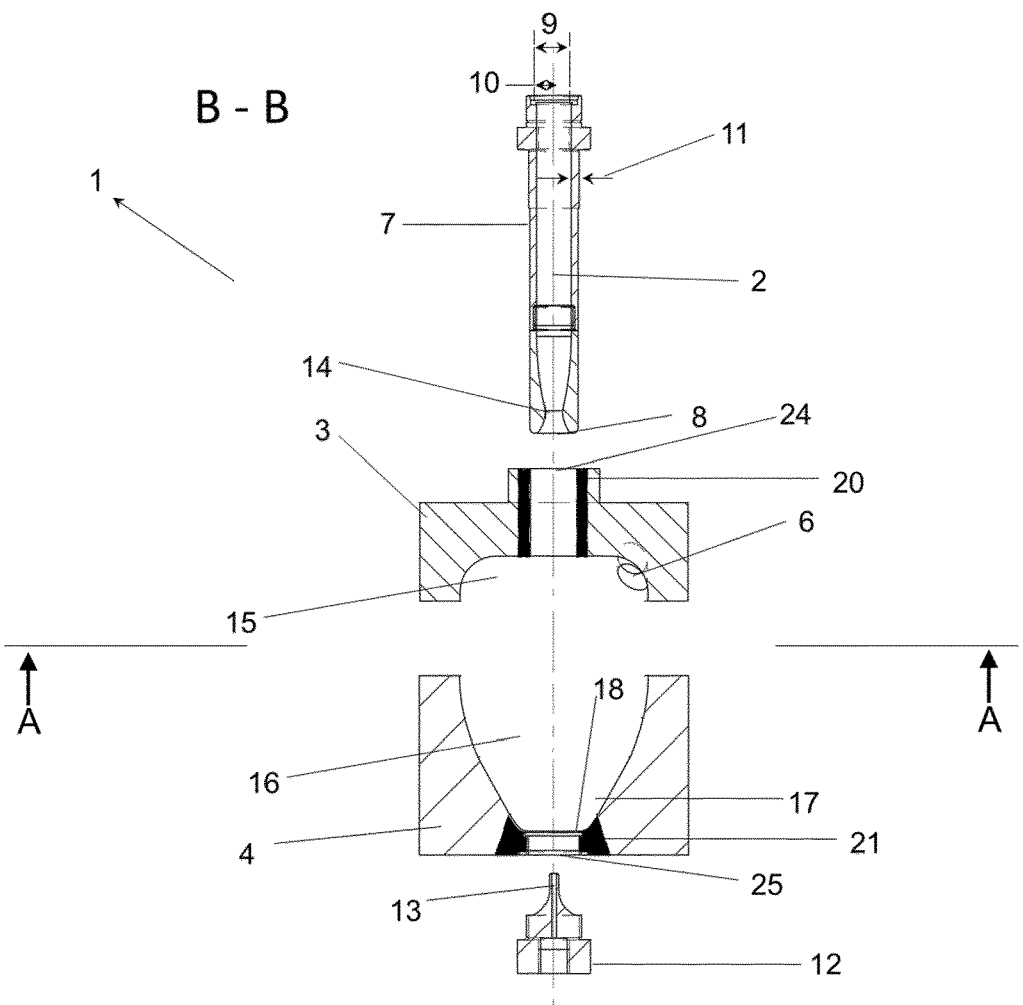
FIG. 2 is an exploded view of the reactor facility of the invention in longitudinal section of the reactor facility of the invention in longitudinal section of the reactor facility along the sectional plane B-B with the outlet pipe as the first electrode and the fluid guide as the second electrode.

FIG. 2 in an exploded view shows the components or parts of the reactor facility 1 of the invention from the cross section along the plane A-A of FIG. 1, which are all located along the longitudinal axis 2. In the longitudinal section of the reactor facility 1 along the plane B-B in the installed state, the outlet pipe 7, the upper part of the housing 3 with the upper part of the reaction chamber 15, the lower part of the housing 4 with the lower part of the reaction chamber 16, and the floor region 17 with the lower boundary of the floor region 18 and the fluid guide 12 with the protrusion 13 are shown. Also visible in the upper part of the housing 3 is the opening 24 for the outlet pipe 7, which opening has the same total cross section as the inlet opening 8 of the outlet pipe 7 and is located adjustably along the longitudinal axis 2. In the lower part of the housing 4 is the opening for the fluid guide 25 can also be seen, which is located along the longitudinal axis 2. Also shown is a delivery opening 6. In addition to the inlet opening 8, the outlet pipe 7 has an outlet opening 9, as well as the nozzle 14 for attaining the Venturi effect, a radius $r_2$ 10 of the outlet pipe 7 from the longitudinal axis 2 to the outer wall of the outlet pipe 7, and a wall thickness d 11. Also shown in the exploded view is the fluid-tight electrical insulation of the outlet pipe 20 as well as the fluid-tight electrical insulation of the fluid guide 21.

Figure 3:
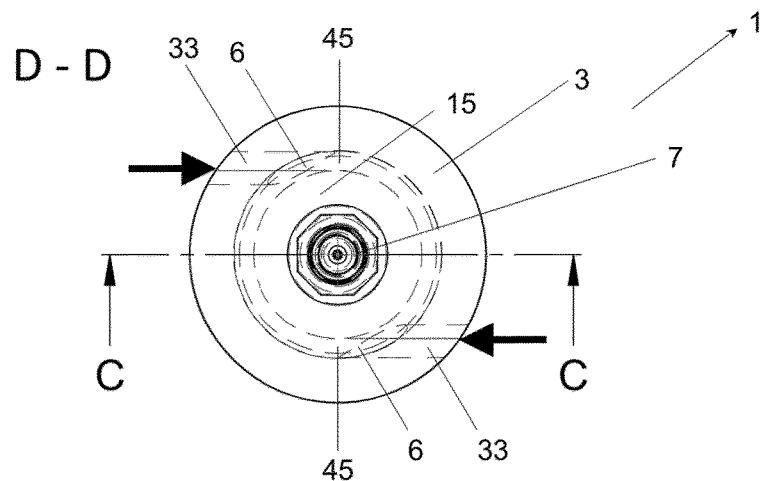
FIG. 3 shows a further plan view in cross section along the sectional plane D-D on the reactor facility of the invention.

FIG. 3 shows a further plan view on the reactor facility 1 of the invention in cross section along the plane D-D with the upper part of the housing 3 and the outlet pipe 7. Two delivery openings 6, opposite one another in longitudinal section of the reactor facility 1 along the plane C-C, discharge in this view along the plane D-D. Opposed inlet pipes 33 discharge in this view along the plane D-D at a tangent to the inner surface of the upper part of the reaction chamber 15 and form two delivery openings 6, which have an elliptical surface in section with the inner surface. The two arrows preceding the respective delivery openings 6 represent the flow direction of the fluid medium. The fluid inlet regions 45 adjoin the respective delivery openings 6.

Figure 4:
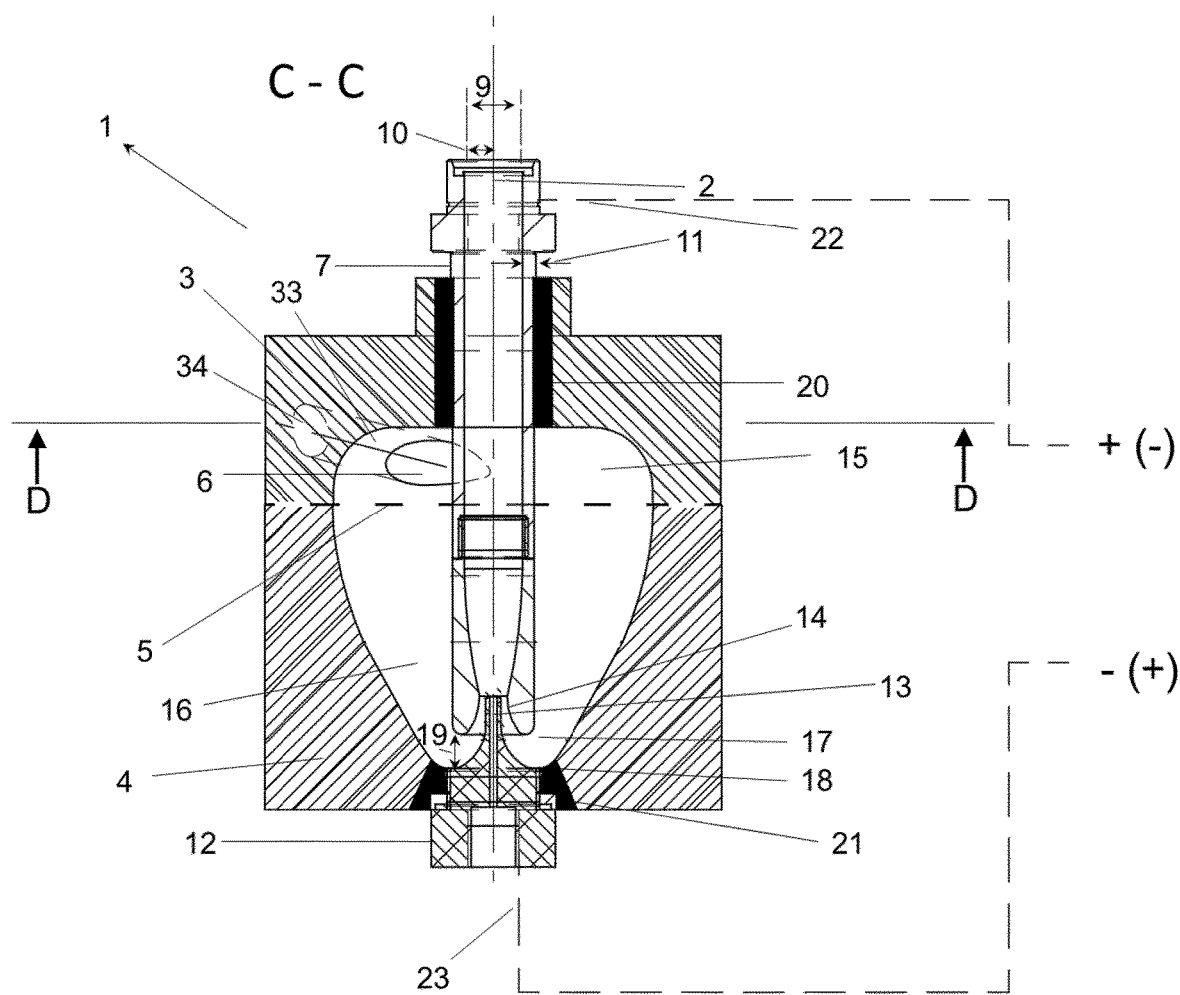
FIG. 4 shows the reactor facility of the invention in longitudinal section of the reactor facility along the sectional plane C-C with the outlet pipe as the first electrode and the fluid guide as the second electrode.

FIG. 4 shows the structure of the reactor facility 1 of the invention from the cross section along the plane D-D of FIG. 3 in longitudinal section of the reactor facility 1 along the plane C-C; the components and parts are located along the longitudinal axis 2. The longitudinal section of the reactor facility 1 along the place C-C extends such that the introduced fluid medium flows out on the left side of the sectional plane D-D in the installed state. All the features and reference numerals refer to one half of the reactor facility 1 in longitudinal section. However, the construction of the second half of the reactor facility 1 on the other side of the longitudinal axis 2 is the same, since the reactor facility 1 is constructed mirror-symmetrically in longitudinal section.

The reactor facility 1 is subdivided along the center plane 5 into an upper part 3 and a lower part 4 of the housing; the inner walls, in contact with fluid, of the housing 3, 4 form a heart-shaped rotationally symmetrical reaction chamber 15, 16 which in the fluid-carrying part is electrically conductive and which likewise has an upper part 15 and a lower part 16. The longitudinal axis 2 is equivalent to the rotary axis of the rotationally symmetrical reaction chamber 15, 16. There is also an outlet pipe 7 in the reactor facility 1.

The fluid medium is introduced into the upper part of the reaction chamber 15 via an inlet pipe 33 through an opening 34 in the housing through a delivery opening 6, which is located at a tangent to the inner surface of the reaction chamber 15, 16, and the fluid medium, dictated by the shape of the reaction chamber 15, 16, assumes an inclined flow direction toward the lower boundary 18 of the floor region 17 of the lower part of the reaction chamber 16. The fluid-carrying walls of the reaction chamber 15, 16 are designed in terms of geometry and the surface such that they produce little frictional resistance and have a low coefficient of friction.

The fluid medium is set into rotation in the upper part of the reaction chamber 15 and forms a fluid eddy, which is steered in the flow direction along the longitudinal axis 2 to the lower part of the reaction chamber 16. The latter extends from the center plane 5 to a curved floor region 17 with the lower boundary 18 of the floor region being a sloped surface of a fluid guide 12. The longitudinal axis of the fluid guide 12 coincides with the longitudinal axis 2 of the reaction chamber 15, 16. The fluid guide has a protrusion 13 with a through bore, which protrudes into the point having the smallest free cross section of the inner walls of the outlet pipe 7. Through the through bore, additional fluid media can be aspirated as needed into the floor region 17 of the lower part of the reaction chamber 16. The point having the smallest free cross section of the inner walls, in contact with fluid, of the outlet pipe 7 is designed as a nozzle 14 for attaining the Venturi effect.

The outlet pipe 7 acts as the first electrode and has a fluid-tight electrical insulation 20 as well as a first electrical connection 22. The fluid guide 12 acts as the second electrode has a fluid-tight electrical insulation 21 as well as a second electrical connection 23. Both electrodes are connected to a regulating or control unit and a power unit (not shown in the drawings). A direct voltage is applied to the electrical connections 22, 23 of the first and second electrodes and has either a positive polarization (+) at the first electrode and a negative polarization (−) at the second electrode, or a negative polarization (−) at the first electrode and a positive polarization (+) at the second electrode.

The rotating fluid eddy is diverted at the sloped surface of the fluid guide 12 while maintaining its speed and enters through the outlet pipe 7 through the inlet opening 8 of the outlet pipe 7. The inlet opening 8 is located in the lower part of the reaction chamber 16 and is spaced apart by a variable spacing a 19 from the lower boundary 18 of the curved floor region 17 of the lower part of the reaction chamber 16. The outlet pipe also has a radius $r_2$ 10 from the longitudinal axis 2 to the outer wall of the outlet pipe 7 as well as a wall thickness d 11. The fluid medium is directed through the outlet opening 9 of the outlet pipe 7 and out of the reactor facility 1.

Figure 5:
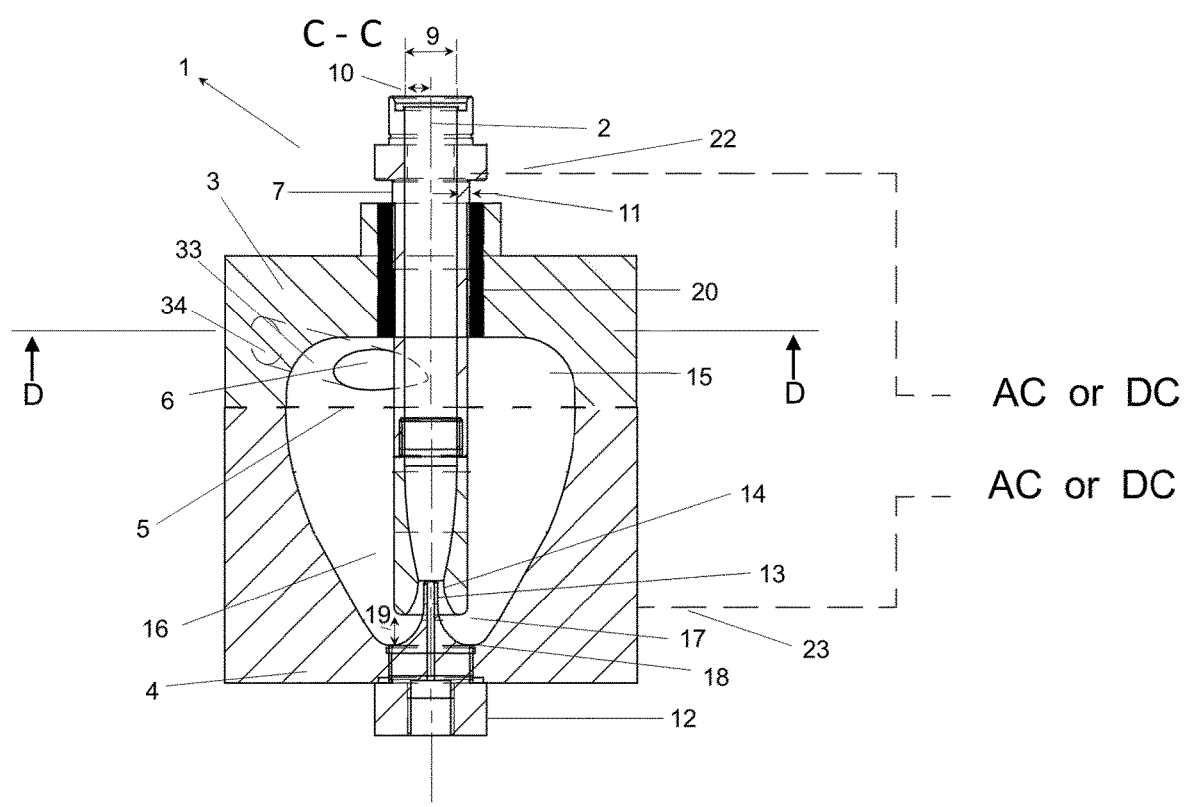
FIG. 5 shows the reactor facility of the invention in longitudinal section of the reactor facility along the sectional plane C-C with the outlet pipe as the first electrode and the housing as the second electrode.

FIG. 5 shows a further embodiment of the reactor facility 1 of the invention in the cross section along the plane D-D of FIG. 3, in the longitudinal section of the reactor facility 1 along the plane C-C. The components or parts are located along the longitudinal axis 2. The longitudinal section of the reactor facility 1 along the plane C-C extends in such a way that the introduced fluid medium flows out on the left side, in the installed state, on the sectional plane D-D. The majority of the features of the construction are the same as for FIG. 4, and therefore will not be described further here.

The fluid medium is introduced into the upper part of the reaction chamber 15 via an inlet pipe 33 through an opening in the housing 34 through a delivery opening 6, which is located at a tangent to the inner surface of the reaction chamber 15, 16, and dictated by the shape of the reaction chamber 15, 16, the fluid medium assumes an inclined flow direction to the lower boundary 18 of the floor region 17 of the lower part of the reaction chamber 16.

The outlet pipe 7 acts as the first electrode and has a fluid-tight electrical insulation 20 as well as a first electrical connection 22. The lower part of the housing 4 acts as the second electrode and has a second electrical connection 23. Both electrodes are connected to a regulating or control unit and a power unit (not shown in the drawings). An alternating voltage (AC) and/or a direct voltage (DC), each with a positive or negative polarization, is applied to the electrical connections 22, 23 of the first and second electrodes.

Figure 6:
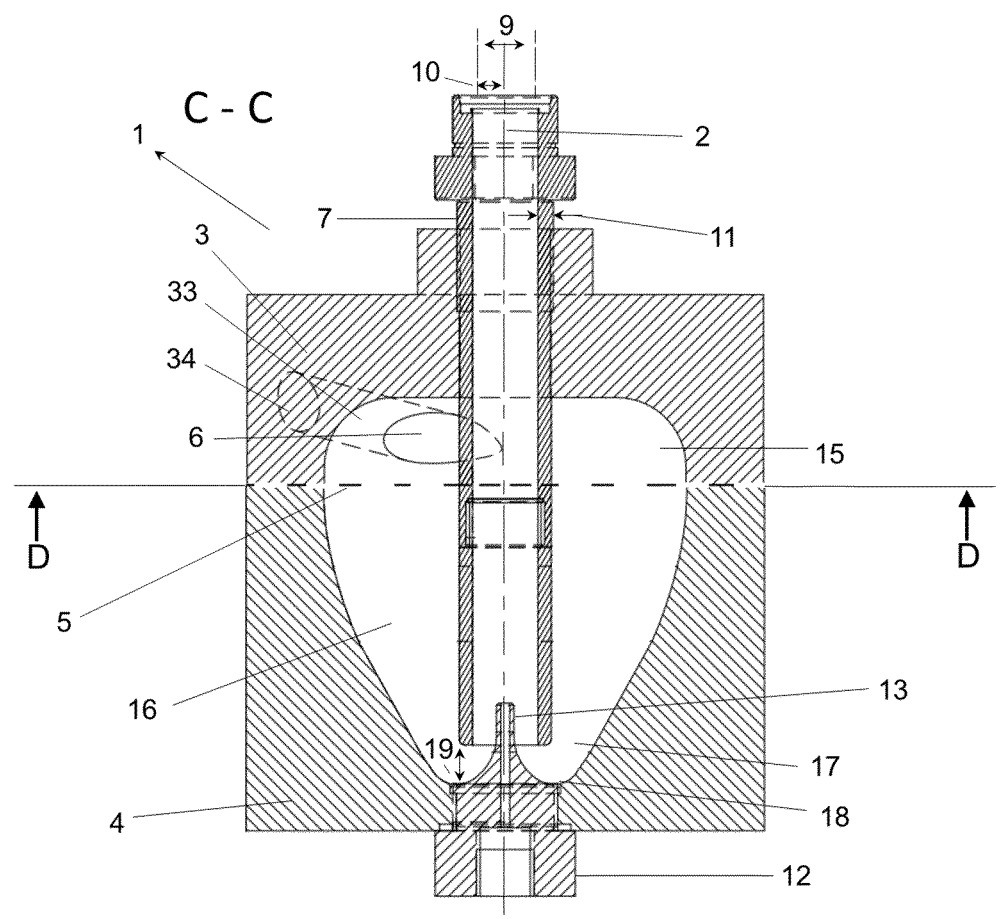
FIG. 6 shows the reactor facility of the invention in longitudinal section of the reactor facility along the sectional plane C-C with the outlet pipe without the nozzle for attaining the Venturi effect.

FIG. 6 shows the construction of the reactor facility 1 of the invention from the cross section along the plane D-D of FIG. 3 in the longitudinal section of the reactor facility 1 along the plane C-C, and the components or parts are located along the longitudinal axis 2. The longitudinal section of the reactor facility 1 extends along the plane C-C, such that the introduced fluid medium in the installed state flows out on the left side on the sectional plane D-D. The majority of the features of the construction are equivalent to those of FIG. 4 and will therefore not be addressed further here.

However, the outlet pipe 7 does not have any smallest free section of the inner walls and thus no nozzle 14 for attaining the Venturi effect. Instead, the opposed inner walls, in contact with fluid, of the outlet pipe 7 form a constant spacing from one another, as a result of which the outlet pipe 7 in the interior acts as a hollow pipe, which adjoins the inlet opening 8 and has the same free cross section.

Figure 7:
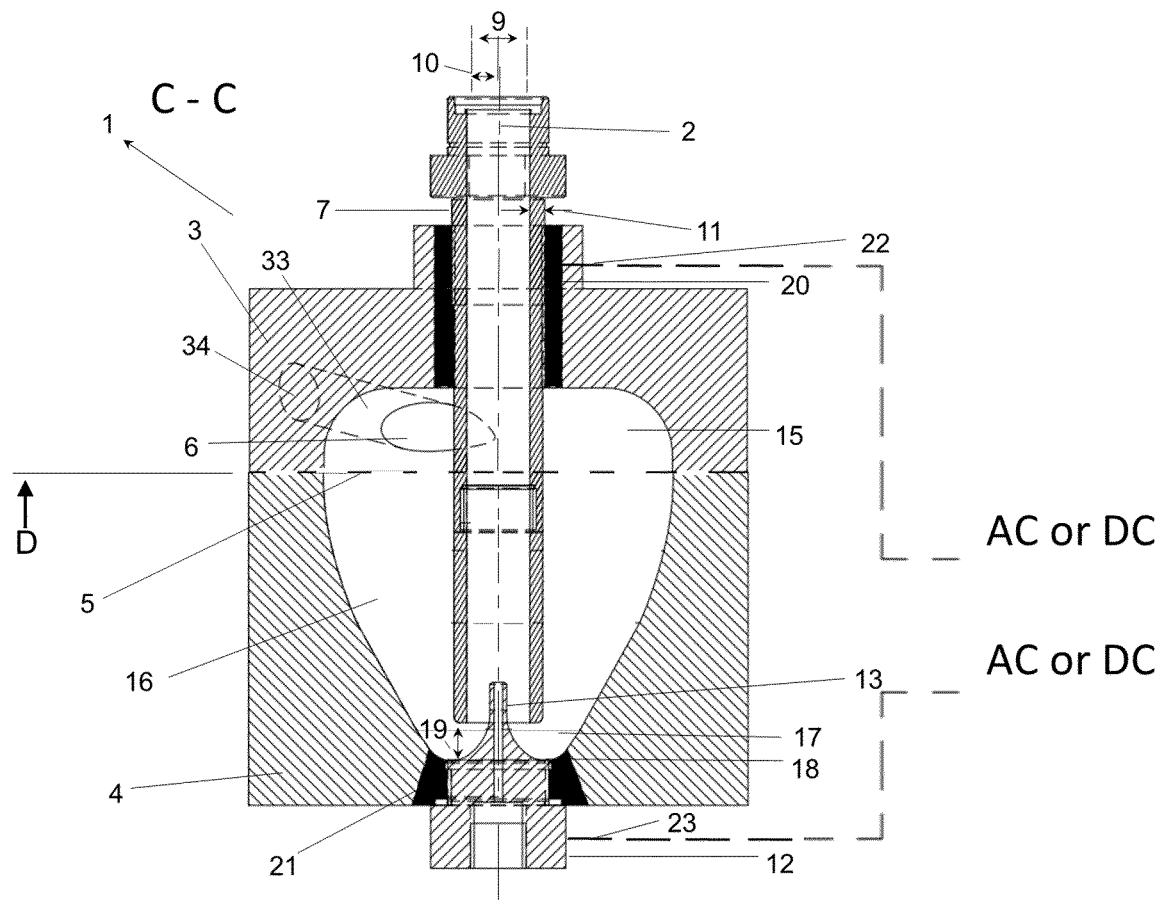
FIG. 7 shows the reactor facility of the invention in longitudinal section of the reactor facility along the sectional plane C-C with the outlet pipe without the nozzle for attaining the Venturi effect. With the outlet pipe as the first electrode and the fluid guide as the second electrode.

FIG. 7 shows the construction of the reactor facility 1 of the invention from the cross section along the plane D-D of FIG. 3 in longitudinal section of the reactor facility 1 along the plane C-C, and the components or parts are located along the longitudinal axis 2. The longitudinal section of the reactor facility 1 extends along the plane C-C, such that the introduced fluid medium in the installed state flows out on the left side on the sectional plane D-D. The majority of the features of the construction are equivalent to those of FIG. 4 and will therefore not be addressed further here.

Analogously to FIG. 6, the outlet pipe 7 does not have any smallest free section of the inner walls and thus no nozzle 14 for attaining the Venturi effect. Instead, the opposed inner walls, in contact with fluid, of the outlet pipe 7 form a constant spacing from one another, as a result of which the outlet pipe 7 in the interior acts as a hollow pipe, which adjoins the inlet opening 8 and has the same free cross section.

The outlet pipe 7 acts as the first electrode and has a fluid-tight electrical insulation 20 as well as a first electrical connection 22. The fluid guide 12 acts as the second electrode and has a second electrical connection 23. Both electrodes are connected to a regulating or control unit and a power unit (not shown in the drawings). An alternating voltage (AC) and/or a direct voltage (DC) is applied to the electrical connections 22, 23 of the first and second electrodes.

Figure 8:
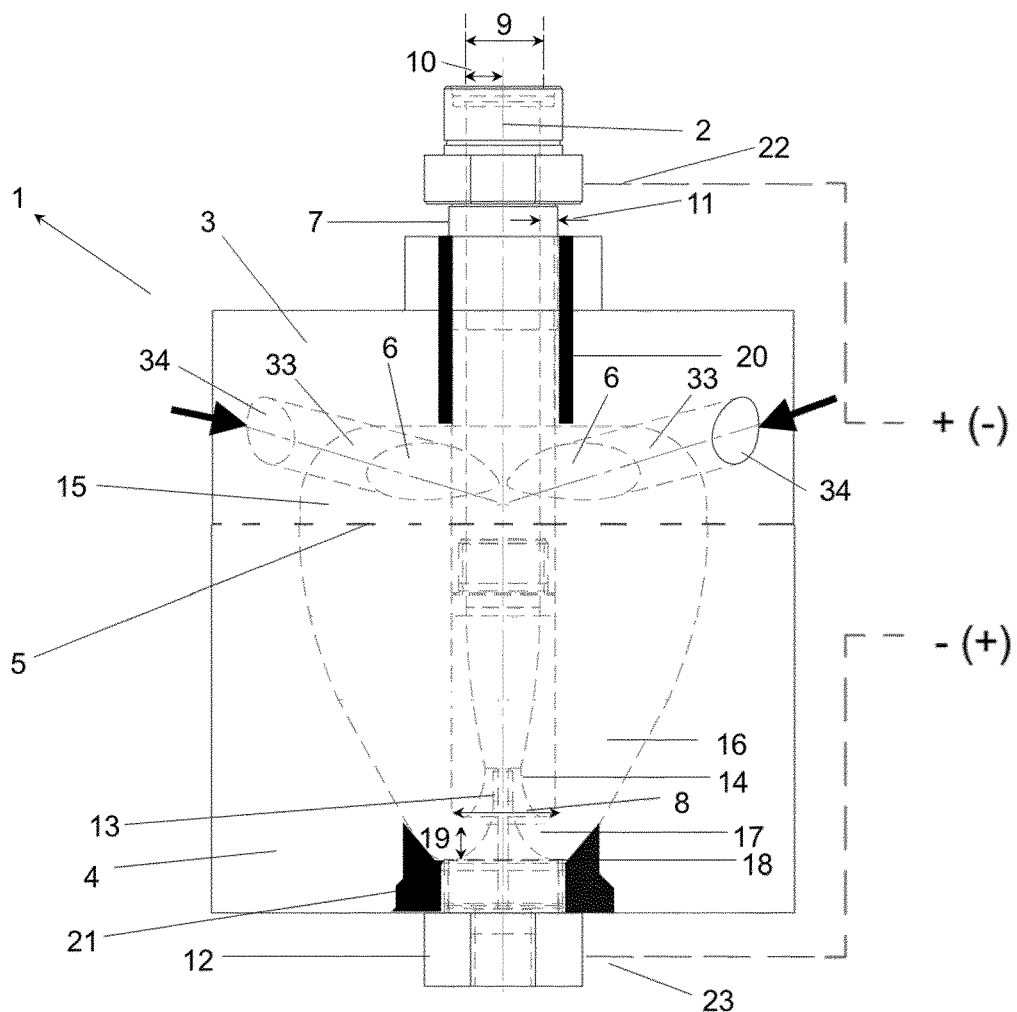
FIG. 8 is a further longitudinal section of the reactor facility of the invention with two supply lines and with the outlet pipe as the first electrode and the fluid guide as the second electrode.

FIG. 8 shows a further embodiment of the reactor facility 1 of the invention, the components or parts of which are located along the longitudinal axis 2. The majority of the features of the construction are equivalent to those of the plan view in FIG. 3 and will therefore not be further addressed here. The longitudinal section of the reactor facility 1 extends such that in the installed state, in the longitudinal section of the reactor facility 1 the introduced fluid medium flows out of the plane on the left side and into the plane on the right side.

This time, however, the fluid medium is introduced via two openings in the housing 34, two inlet pipes 33 and two delivery openings 6, which are located at a tangent in the cross section to the inner surface of the reaction chamber 15, 16, into the upper part of the reaction chamber 15. The medium here assumes a flow direction inclined to the lower boundary 18 of the floor region 17 of the lower part of the reaction chamber 16 because of the shape of the reaction chamber 15, 16.

The outlet pipe 7 acts as the first electrode and has a fluid-tight electrical insulation 20 as well as a first electrical connection 22. The fluid guide 12 acts as the second electrode has a fluid-tight electrical insulation 21 as well as a second electrical connection 23. Both electrodes are connected to a regulating or control unit and a power unit (not shown in the drawings). A direct voltage is applied to the electrical connections 22, 23 of the first and second electrodes and has either a positive polarization (+) at the first electrode and a negative polarization (−) at the second electrode, or a negative polarization (−) at the first electrode and a positive polarization (+) at the second electrode.

Figure 9:
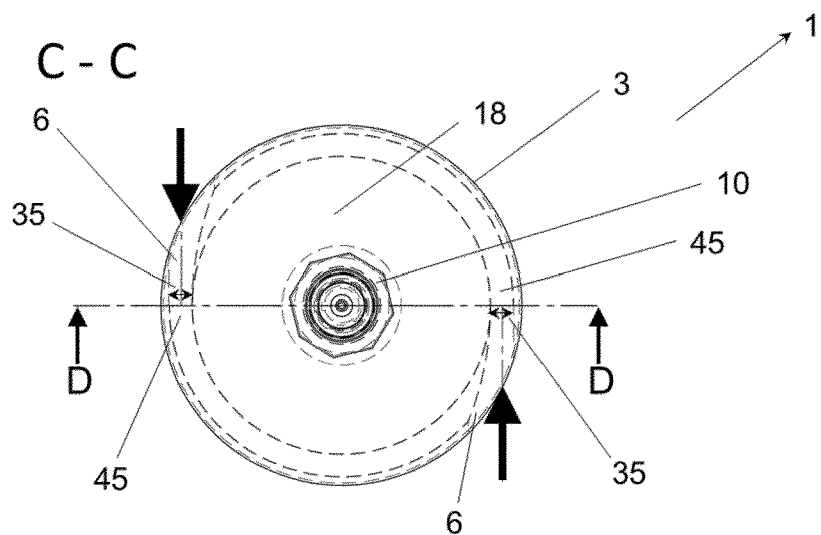
FIG. 9 is a plan view in cross section along the sectional plane C-C to the reactor facility of the invention.

FIG. 9 in plan view and in cross section along the plane C-C shows the reactor facility 1 of the invention with the upper part of the housing 3 and the outlet pipe 10. Two inlet pipes (not shown) that in longitudinal section of the reactor facility 1 are opposite one another along the plane D-D discharge, in the view along the plane C-C, tangentially to the inner surface of the upper part of the reaction chamber 18 and form two delivery openings 6, which in section have an elliptical surface with the inner surface. The two arrows before the respective delivery openings 6 represent the flow direction of the fluid medium. The delivery openings 6 are each adjoined by the fluid inlet regions 45 in the flow direction, which each respectively in longitudinal section to the reactor facility 1 have a circular surface with a diameter $d_z$ 35.

Figure 10:
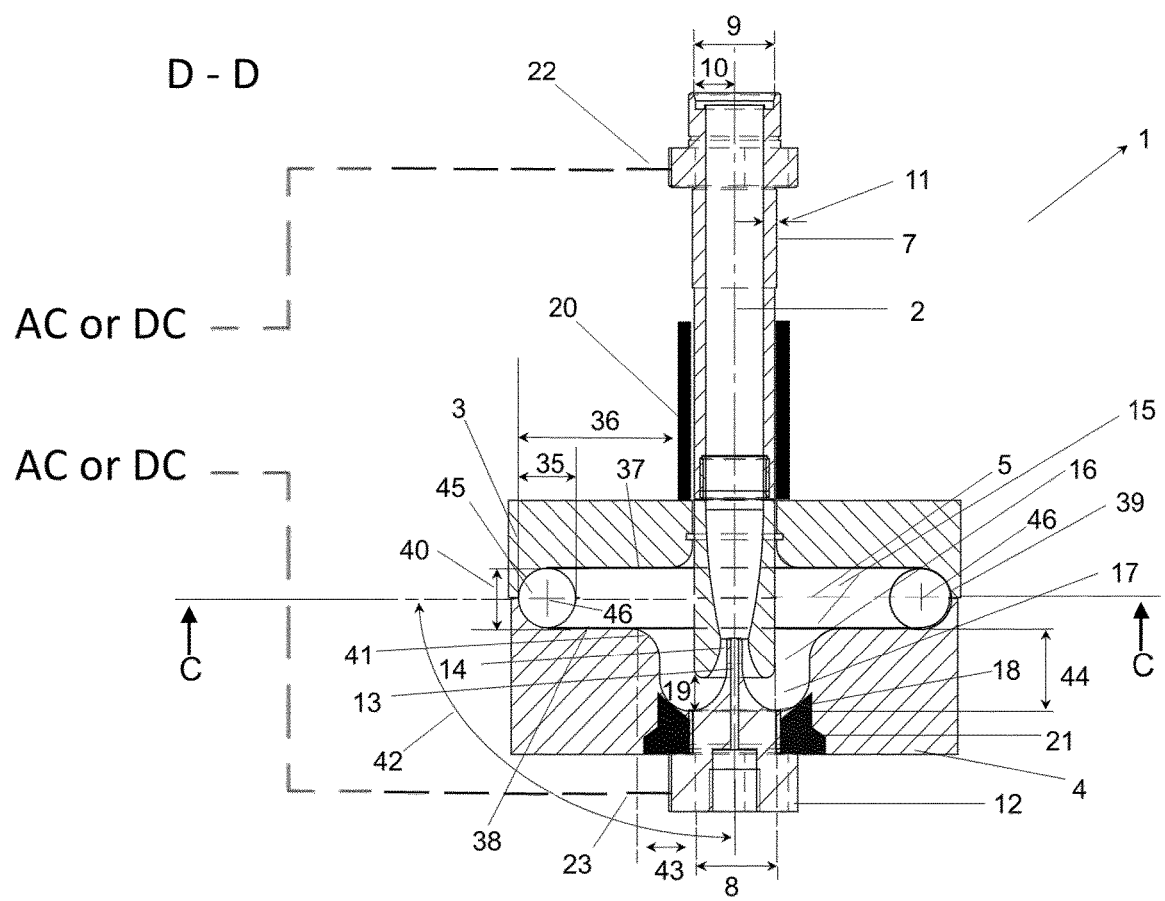
FIG. 10 shows the reactor facility of the invention in an alternative embodiment, with an alternatively designed upper part of the reaction chamber in longitudinal section of the reactor facility along the sectional plane D-D with the outlet pipe as the first electrode and the housing as the second electrode.

FIG. 10 shows a further embodiment of a reactor facility 1 of the invention from the cross section along the plane C-C of FIG. 9 in the longitudinal section of the reactor facility 1 along the plane D-D. The components or parts of the reactor facility 1 are located along the longitudinal axis 2, and the fluid inlet region 45 is shown on the left and right sides in the sectional view in the installed state. The fluid medium introduced flows on the left side out of the sectional plane D-D. In the fluid inlet region 45 on the right side in the sectional view, on the other hand, the introduced fluid medium flows into the sectional plane D-D. The reactor facility 1 is subdivided along the center plane 5 into an upper part 3 and a lower part 4. The inner walls in contact with fluid of the housing 3, 4 form a rotationally symmetrical reaction chamber 15, 16, which likewise has an upper part 15 and a lower part 16. The upper part of the reaction chamber 15 has a top face 37 and a bottom face 38 as well as a transition region 39 from the top face to the bottom face. The longitudinal axis 2 is equivalent to the rotary axis of the rotationally symmetrical reaction chamber 15, 16. An outlet pipe 7 is also found in the reactor facility 1.

The fluid medium is introduced into the upper part of the reaction chamber 15 through a delivery opening (not shown in the longitudinal section), which is located at a tangent in the cross section to the inner surface of the upper part of the reaction chamber 15. A fluid inlet region 45 adjoins the delivery opening (not shown in the longitudinal section) in the flow direction, which fluid inlet region in longitudinal section to the reactor facility 1 on the longitudinal sectional edge has a circular surface with a diameter $d_z$ 35 and an associated center point 46. The center plane 5 extends through the center point 46 of the fluid inlet region 45. The spacing b 40 between the top face 37 and the bottom face 38 is constant. The setting angle α 42 refers to the angle which, viewed in longitudinal section in the installed state, is established from the center plane 5, which extends through the center point 46 of the fluid inlet region 45, to the longitudinal axis 2. The setting angle 42 when α=90° refers to the angle, established in the installed state, below the center plane 5, that is, from the center plane 5 to the longitudinal axis 2 of the reaction chamber 15, 16. For that purpose, the section of the longitudinal axis 2 with the center plane 5 represents a Cartesian coordinate system. The setting angle α 42=90° thus refers always to the third and fourth quadrants of the Cartesian coordinate system. At the setting angle α 42=90°, the spacing b 40 is equal to the diameter dz 35 of the fluid inlet region 45 and is thus equivalent to the height of the upper part of the reaction chamber 15. The spacing from the transition region 39 from the top face to the bottom face in the upper part of the reaction chamber 15 and the outer wall of the outlet pipe 7 is equivalent to the maximum spacing $r_{max}$ 36 of the upper part of the reaction chamber 15. The fluid-carrying walls of the reaction chamber 15, 16 are designed such that in terms of their geometry and surface, they generate a slight frictional resistance and coefficient of friction.

The fluid medium is set to rotation in the upper part of the reaction chamber 15 and forms a fluid eddy, which is steered in the flow direction along the longitudinal axis 2 into the lower part of the reaction chamber 16. The lower part of the reaction chamber 16, from the transition 39 from the bottom face, extends to a curved floor region 17 with the lower boundary 18 of the floor region. The radius $r_3$ 43 is equivalent to the spacing from the transition 41 of the bottom face of the lower part 18 of the reaction chamber to the outer wall of the outlet pipe 7. Furthermore, z 44 is equivalent to the spacing of the lower part of the reaction chamber 16, from the point where the top face 37 and the bottom face 38 of the upper part of the reaction chamber 15 no longer have a constant spacing b 40 from one another. Here, z 44 extends to the lower boundary 18 of the floor region 17 of the lower part of the reaction chamber 16.

A geometrically ascendingly shaped fluid guide 12 is located in the lower part of the housing 4, and its longitudinal axis coincides with the longitudinal axis 2 of the reaction chamber 15, 16. The fluid guide has a protrusion 13 with a through bore, which protrudes into the location having the smallest free cross section of the inner walls of the outlet pipe 7. Through the through bore, additional fluid media can be aspirated as needed into the floor region 17 of the lower part of the reaction chamber 16. The location with the smallest free cross section of the inner walls, in contact with fluid, of the outlet pipe 7 is designed as a nozzle 14 for attaining the Venturi effect. The rotating fluid eddy is diverted, while maintaining its speed, at the fluid guide 12 and enters through the inlet opening 8 into the outlet pipe 7. The inlet opening 8 is located in the lower part of the reaction chamber 16 and is spaced apart at a variable spacing a 19 from the lower boundary 18 of the curved floor region 17 of the lower part of the reaction chamber 16. Furthermore, the outlet pipe has a radius $r_2$ 10 from the longitudinal axis 2 to the outer wall of the outlet pipe 7 and also has a wall thickness d 11. The fluid medium is carried out of the reactor facility 1 through the outlet opening 9 of the outlet pipe 7.

The fluid-carrying walls of the reaction chamber 15, 16 are designed such that in terms of their geometry and the surface area, they produce a low frictional resistance and coefficient of friction. Because of the lesser friction of the fluid medium in the reaction chamber 15, 16 of the invention, the requisite pressure for generating the fluid eddy and for attaining the Venturi effect in the nozzle 14, with a superimposed negative pressure of −0.99 bar, is 3.5 bar, which is approximately 42% lower compared to EP 1 294 474, which for the same reaction chamber volume requires a pressure of 6.0 bar.

The outlet pipe 7 acts as the first electrode and has a fluid-tight electrical insulation 20 as well as a first electrical connection 22. The fluid guide 12 acts as the second electrode and has a fluid-tight electrical insulation 21 as well as a second electrical connection 23. Both electrodes are connected to a regulating or control unit and to a power unit (not shown in the drawing). A direct voltage and/or alternating voltage is applied to the electrical connections 22, 23 of the first and second electrodes.

Figure 11:
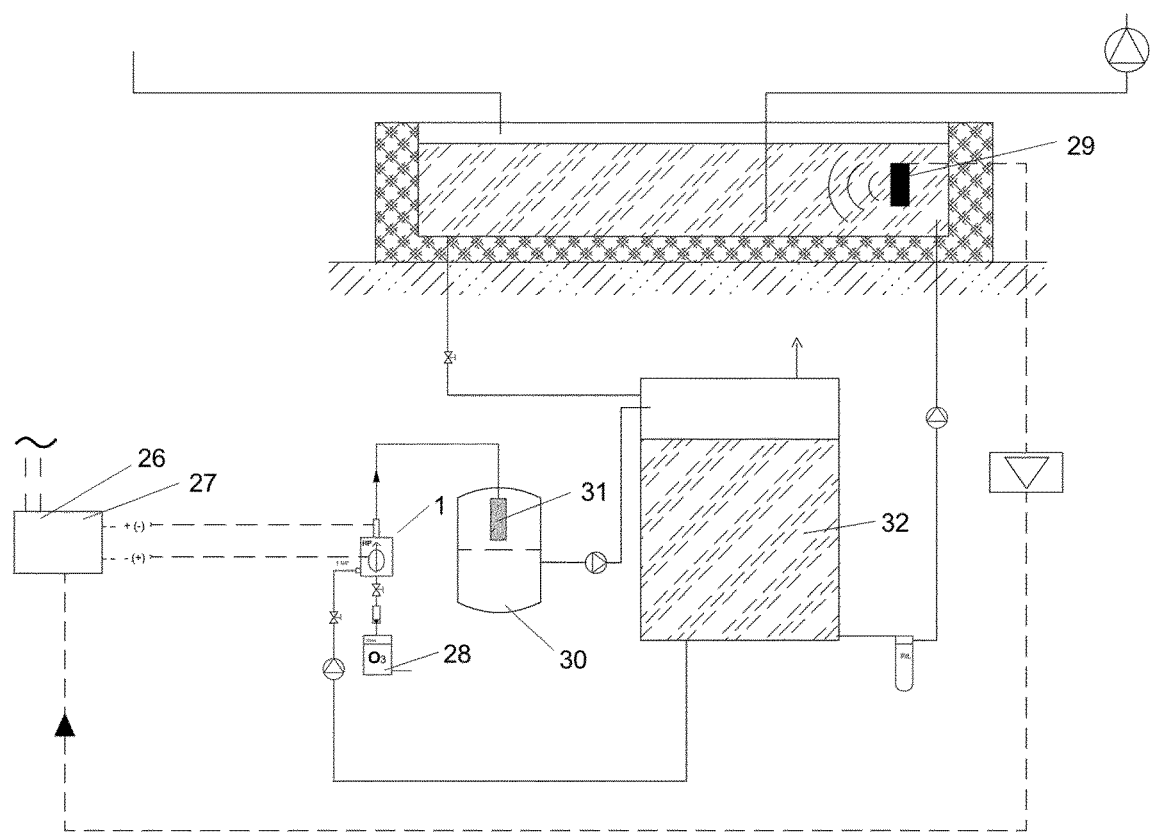
FIG. 11 shows the reactor facility of the invention incorporated into a closed circuit with a regulating unit, power unit, degassing, and a sensor for measuring the redox value and a variant with a front-mounted gravel filter and catalytic converter and automatic ozone aspiration.

FIG. 11 shows a reactor facility 1 of the invention, incorporated into a closed circuit, which is connected to a regulating unit 26 and a power unit 27. A sensor 29 for measuring the redox value and a catalyst 31 are located in a closed circuit as well. A reaction tank 30, a storage container 32, and an ozone reservoir 28 are also incorporated into the closed circuit, through which ozone can be supplied, as an additional fluid medium in the reactor facility 1.

Figure 12:
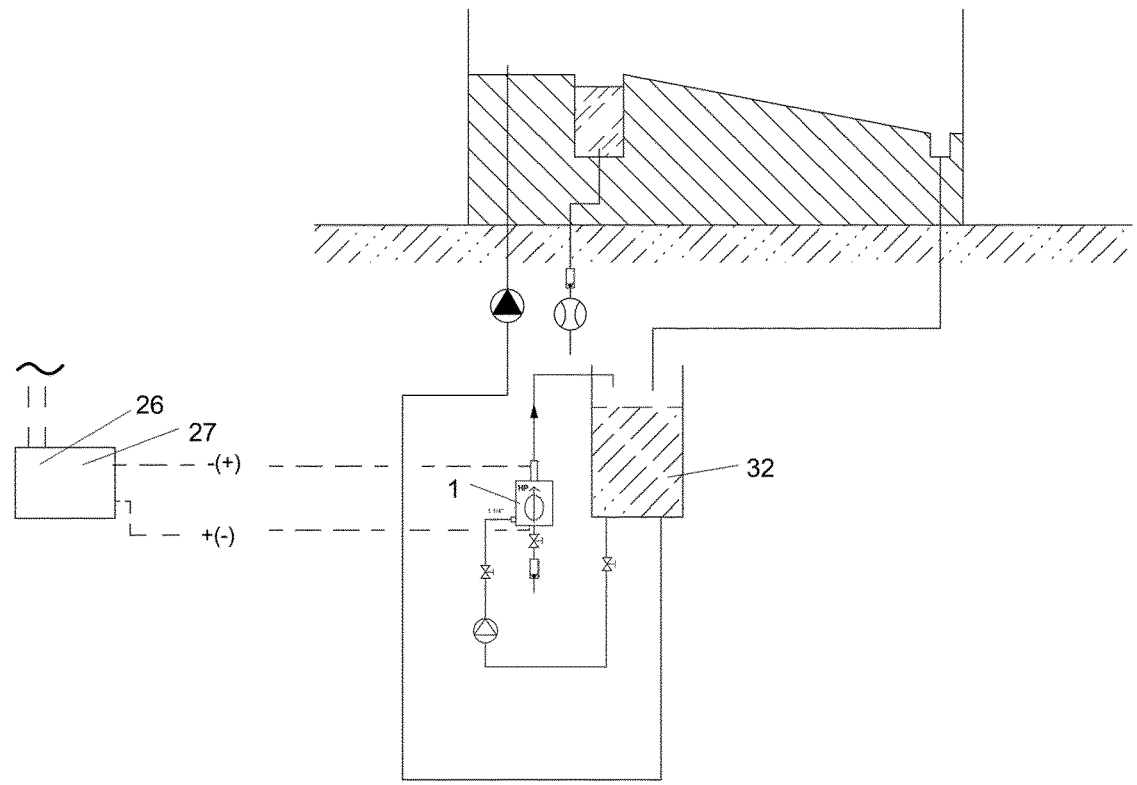
FIG. 12 shows the reactor facility of the invention incorporated into an open circuit.

FIG. 12 shows the reactor facility 1 of the invention, incorporated into an open circuit, which is connected to a regulating unit 26 and a power unit 27. A storage container 32 is also shown in the open circuit.

Exemplary Embodiment of Slaughterhouse Waste Water Treatment

The device of the invention can be employed for instance in the rinsing and waste waters that occur in slaughterhouses or large-scale slaughtering operations. Because of the high proportion of blood, the water has a high protein content. With the device and the method of the invention, the BOD and COD values can be improved drastically and in a short time in the electrolysis of the slaughterhouse waste waters.

The slaughterhouse waste waters are treated on the one hand purely flow-dynamically, without adding air, through the through bore of the fluid guide, and also with an additional electrolysis with the addition of air through the through bore of the fluid guide.

In the purely flow-dynamics treatment, a COD value of 4300 mg/l and a BOD value of 2070 mg/l can be measured; conversely, in the additional electrolysis with the delivery of air, a COD value of 3300 mg/l and a BOD value of 1790 mg/l can be measured. Further measurements for the purely flow-dynamics treatment of the slaughterhouse waste water produce a COD value of 2800 mg/l and a BOD value of 1250 mg/l. Conversely, in the additional electrolysis with the delivery of air, a COD value of 1600 mg/l and a BOD value of 670 mg/l can be measured. It can therefore be seen unequivocally that COD and BOD values, by means of an additional electrolytic treatment of the slaughterhouse water, are markedly lower than with a purely flow-dynamics treatment.

LIST OF REFERENCE NUMERALS

1 Reactor facility
2 Longitudinal axis of the reaction chamber
3 Housing, upper part
4 Housing, lower part
5 Center plane
6 Delivery opening
7 Outlet pipe
8 Inlet opening of the outlet pipe (total cross section)
9 Outlet opening of the outlet pipe (total cross section)
10 Radius $r_2$ of the outlet pipe (from the longitudinal axis to the outer wall)
11 Wall thickness d of the outlet pipe
12 Fluid guide
13 Protrusion of the fluid guide
14 Nozzle for attaining the Venturi effect
15 Reaction chamber, upper part
16 Reaction chamber, lower part
17 Floor region of the lower part of the reaction chamber
18 Lower boundary of the floor region of the lower part of the reaction chamber
19 Spacing a between the inlet opening of the outlet pipe and the lower boundary of the floor region of the lower part of the reaction chamber
20 Electrical insulation of the outlet pipe
21 Electrical insulation of the fluid guide
22 First electrical connection of the first electrode
23 Second electrical connection of the second electrode
24 Opening in the upper part of the housing for the outlet pipe
25 Opening in the lower part of the housing for the fluid guide
26 Regulation or control unit
27 Power part
28 Ozone reservoir
29 Sensor
30 Reaction tank
31 Catalyst
32 Storage container
33 Inlet pip
34 Opening in the housing for the inlet pipe
35 Diameter $d_z$ of the fluid inlet region that in the flow direction adjoins the delivery opening located tangentially to the upper part of the reaction chamber
36 Radius $r_{max}$ (spacing from transition region from the top face to the bottom face in the upper part of the reaction chamber to the outer wall of the outlet pipe)
37 Top face of the upper part of the reaction chamber
38 Bottom face of the upper part of the reaction chamber
39 Transition region from the top face to the bottom face in the upper part of the reaction chamber
40 Spacing b between the top face and the bottom face
41 Transition of the bottom face of the lower part of the reaction chamber
42 Setting angle α for the longitudinal axis
43 Radius $r_3$ (spacing from the transition of the bottom face of the lower part of the reaction chamber to the outer wall of the outlet pipe)
44 Spacing z from the bottom face of the lower part of the reaction chamber from the point at which the top face and the bottom face no longer have a constant or decreasing spacing from one another to the lower boundary of the floor region of the lower part of the reaction chamber
45 Fluid inlet region
46 Center point of the fluid inlet region

The invention claimed is:

1. A device in the form of a flow dynamic reactor facility (1) for receiving a fluid medium for producing and flow-dynamically and electrolytically treating, at least one guided fluid eddy, including a housing (3, 4) and an outlet pipe (7), wherein the housing (3, 4)
by means of the fluid-contact-side inner walls forms a fluid-carrying hollow chamber, hereinafter called reaction chamber (15, 16), that is rotationally symmetrical about a longitudinal axis (2);
wherein the reaction chamber (15, 16)
is split into an upper part (15) and a lower part (16)
and the upper part of the reaction chamber (15) has at least one delivery opening (6), located tangentially to the inner surface of the upper part of the reaction chamber (15), through which delivery opening the fluid medium is introduced into the reaction chamber (15, 16);
and the lower part of the reaction chamber (16) extends as far as the lower boundary (18) of a curved floor region (17) from which an elongated fluid guide (12) with a sloped surface (12A) diverts the fluid medium into an inlet opening (8) of the outlet pipe (7); and
the outlet pipe (7) coincides in its longitudinal axis with the longitudinal axis (2) of the rotationally symmetrical reaction chamber (15, 16), and the inlet opening (8) of the outlet pipe (7) is located in the vicinity of the lowest boundary (18), of the curved floor region (17),
wherein, the longitudinal axis of the reaction chamber has a vertical orientation,
wherein the fluid guide is disposed at the bottom end of the reaction chamber,
characterized in that
a first electrode and a second electrode are fluid carrying components, and the first and the second electrodes, comprise an insulation plastic or a metal coating that are not in any physical contact with one another, and
characterized in that
the outlet pipe (7) is embodied at least partially as the first electrode, and that at least a part of the inner walls, in contact with fluid, of the housing (3, 4), or the fluid guide (12), is embodied as the second electrode, or vice versa.

2. The device of claim 1, characterized in that the outlet pipe (7) and/or the fluid guide (12) is adjustable and displaceable along the longitudinal axis (2).

3. The device of claim 1, characterized in that the fluid guide (12) has a through bore along the longitudinal axis (2).

4. The device of claim 1, characterized in that the first and second electrodes communicate via electrical lines and connections (22, 23).

5. The device of claim 1, characterized in that the upper part of the reaction chamber (15) has more than one delivery opening (6) located tangentially to the inner surface of the upper part of the reaction chamber (15).

6. The device of claim 1, characterized in that at least some of the inner walls of the reaction chamber are catalytically coated or consist entirely of a catalytic material.

7. The device of claim 1, characterized in that a plurality of regions, where electrolysis takes place, are set up simultaneously.

8. A method for operating the device of claim 1,
wherein the fluid medium to be treated is carried in at least one volume of fluid that flows through the reactor via the at least one delivery opening (6) into the upper part of the rotationally symmetrical reaction chamber (15) of the housing (3, 4) in such a way
that the at least one volume of fluid medium that flows through the reactor in a translational and rotational motion along the longitudinal axis (2), said translational and rotational motion is oriented a flow direction downward from said at least one delivery opening (6) toward the fluid guide and diverted upward into the inlet opening of the outlet pipe, and the at least one volume of fluid medium that flows through the reactor forms a rotating fluid eddy,
which in terms of flow technology forms a turbulent boundary layer, so that high centrifugal forces occur in the fluid eddy;
and that the fluid eddy is deflected at sloped surface (12A) of the fluid guide (12) into an ascending motion that is opposite the downward-oriented translational and rotational motion along the longitudinal axis (2) into the inlet opening (8) of the outlet pipe (7),
characterized in that
parts of the fluid-carrying components of the reactor facility, namely, the outlet pipe, the inner walls, and the fluid guide, (1) are embodied as a first and second electrode, and the first and second electrodes are insulated electrically in fluid-tight fashion from one another (20, 21),
and an electrical voltage at the first and second electrodes is applied independently of one another,
and as a result in the fluid medium, electrolysis is performed,
and by the combination of flow-dynamic and electrolytic treatment of the at least one fluid eddy, the conversion and/or mechanical and physical destruction, and/or radicalization of chemical substances or microorganisms located in the fluid medium, takes place.

9. The method of claim 8, characterized in that the outlet pipe (7) is embodied at least partially as the first electrode; and that at least a part of the inner walls, in contact with fluid, of the housing (3, 4), and/or the fluid guide (12), is embodied as the second electrode; said first and second electrodes comprise an insulation plastic or a metal coating that are not in any physical contact with one another.

10. The method of claim 8, wherein fluid medium can be aspirated into the lower part of the reaction chamber by means of negative pressure prevailing in the floor region of the reaction chamber, along the longitudinal axis (2) through a through bore of the fluid guide (12), into the inlet opening (8) of the outlet pipe (7), and it is the same and/or different fluid medium from the fluid medium introduced into the delivery opening (6).

11. A method of flow-dynamic treatment of a fluid medium utilizing a device in the form of a flow dynamic reactor facility for receiving a fluid medium for producing, and flow-dynamically and electrolytically treating, a guided fluid eddy, including a housing (3, 4) and an outlet pipe (7), wherein the housing (3, 4) by means of the fluid-contact-side inner walls forms a fluid-carrying hollow chamber, namely, a reaction chamber (15, 16), that is rotationally symmetrical about a longitudinal axis (2); wherein the reaction chamber (15, 16) is split into an upper part (15) and a lower part (16) and the upper part of the reaction chamber (15) has at least one delivery opening (6), located tangentially to the inner surface of the upper part of the reaction chamber (15), through which delivery opening the fluid medium is introduced into the reaction chamber (15, 16); and the lower part of the reaction chamber (16) extends as far as the lower boundary (18) of a curved floor region (17), where a fluid guide (12) with a sloped surface (12A) diverts the fluid medium into an inlet opening (8) of the outlet pipe (7); and the outlet pipe (7) coincides in its longitudinal axis with the longitudinal axis (2) of the rotationally symmetrical reaction chamber (15, 16), and the inlet opening (8) of the outlet pipe (7) is located in the vicinity of the lowest boundary (18) of the curved floor region (17); wherein, the longitudinal axis of the reaction chamber has a vertical orientation;
wherein the fluid guide is disposed at the bottom end of the reaction chamber; said outlet pipe (7) and the fluid guide of the reactor facility (1) being embodied as a first electrode and a second electrode, respectively, and the first and the second electrodes comprise an insulation plastic or a metal coating that are not in any physical contact with one another, and the outlet pipe (7) being embodied at least partially as the first electrode where at least a part of the inner walls, in contact with the fluid medium, of the housing (3, 4), or the fluid guide (12), is embodied as the second electrode, or vice versa,
comprised of the following steps:
carrying at least one volume of fluid medium that flows through the reactor via the at least one delivery opening (6) into an upper part of the reaction chamber of the housing;
flowing the at least one volume of fluid medium through the reactor in a translational and rotational motion along said longitudinal axis of the rotationally symmetrical reaction chamber, which motion is oriented downward with the at least one volume of fluid medium that flows through the reactor forming a rotating fluid eddy, and
deflecting the fluid eddy at said sloped surface (12A) of the fluid guide (12) into an ascending motion.

* * * * *